US008301586B1

(12) United States Patent
Lattyak et al.

(10) Patent No.: US 8,301,586 B1
(45) Date of Patent: Oct. 30, 2012

(54) FACILITATING THE CREATION AND USE OF COLLECTIONS ON AN ELECTRONIC DEVICE

(75) Inventors: John Lattyak, Los Gatos, CA (US); Laurent An Minh Nguyen, Los Altos, CA (US); John T. Kim, La Canada, CA (US); Robert Wai-Chi Chu, Oakland, CA (US)

(73) Assignee: Amazon Technologies, Inc., Reno, NV (US)

( * ) Notice: Subject to any disclaimer, the term of this patent is extended or adjusted under 35 U.S.C. 154(b) by 390 days.

(21) Appl. No.: 12/242,457

(22) Filed: Sep. 30, 2008

(51) Int. Cl.
*G06F 7/00* (2006.01)
*G06F 17/00* (2006.01)

(52) U.S. Cl. .......................... 707/608; 707/640; 707/705

(58) Field of Classification Search .................. 707/608, 707/640, 705, 999.8
See application file for complete search history.

(56) References Cited

U.S. PATENT DOCUMENTS

| | | | | |
|---|---|---|---|---|
| 7,865,567 | B1 * | 1/2011 | Hendricks et al. | 709/214 |
| 2002/0120635 | A1 * | 8/2002 | Joao | 707/200 |
| 2003/0144961 | A1 * | 7/2003 | Tharaken et al. | 705/57 |
| 2006/0282797 | A1 * | 12/2006 | Barsness et al. | 715/864 |
| 2007/0202481 | A1 * | 8/2007 | Smith Lewis et al. | 434/323 |
| 2007/0203887 | A1 * | 8/2007 | Dynin | 707/3 |
| 2007/0298399 | A1 * | 12/2007 | Shao et al. | 434/317 |
| 2008/0147728 | A1 * | 6/2008 | Reichert | 707/104.1 |
| 2008/0243805 | A1 * | 10/2008 | Gutta et al. | 707/5 |
| 2008/0255970 | A1 * | 10/2008 | Ferguson | 705/30 |
| 2009/0307333 | A1 * | 12/2009 | Welingkar et al. | 709/219 |

* cited by examiner

*Primary Examiner* — Hares Jami
(74) *Attorney, Agent, or Firm* — Lee & Hayes, PLLC

(57) ABSTRACT

A method for facilitating the creation and use of collections on an electronic device may include receiving user input related to the creation of collections of items that are stored on the electronic device. The method may also include creating the collections of items. The method may also include storing the collections of items on the electronic device. The method may also include backing up the collections to a backup server.

16 Claims, 13 Drawing Sheets

FACILITATING THE CREATION AND USE OF COLLECTIONS ON AN ELECTRONIC DEVICE

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Advances in electronic and computer-related technologies have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. Benefits may be realized from improved systems and methods for interacting with an electronic device.

DETAILED DESCRIPTION

Figure 1:
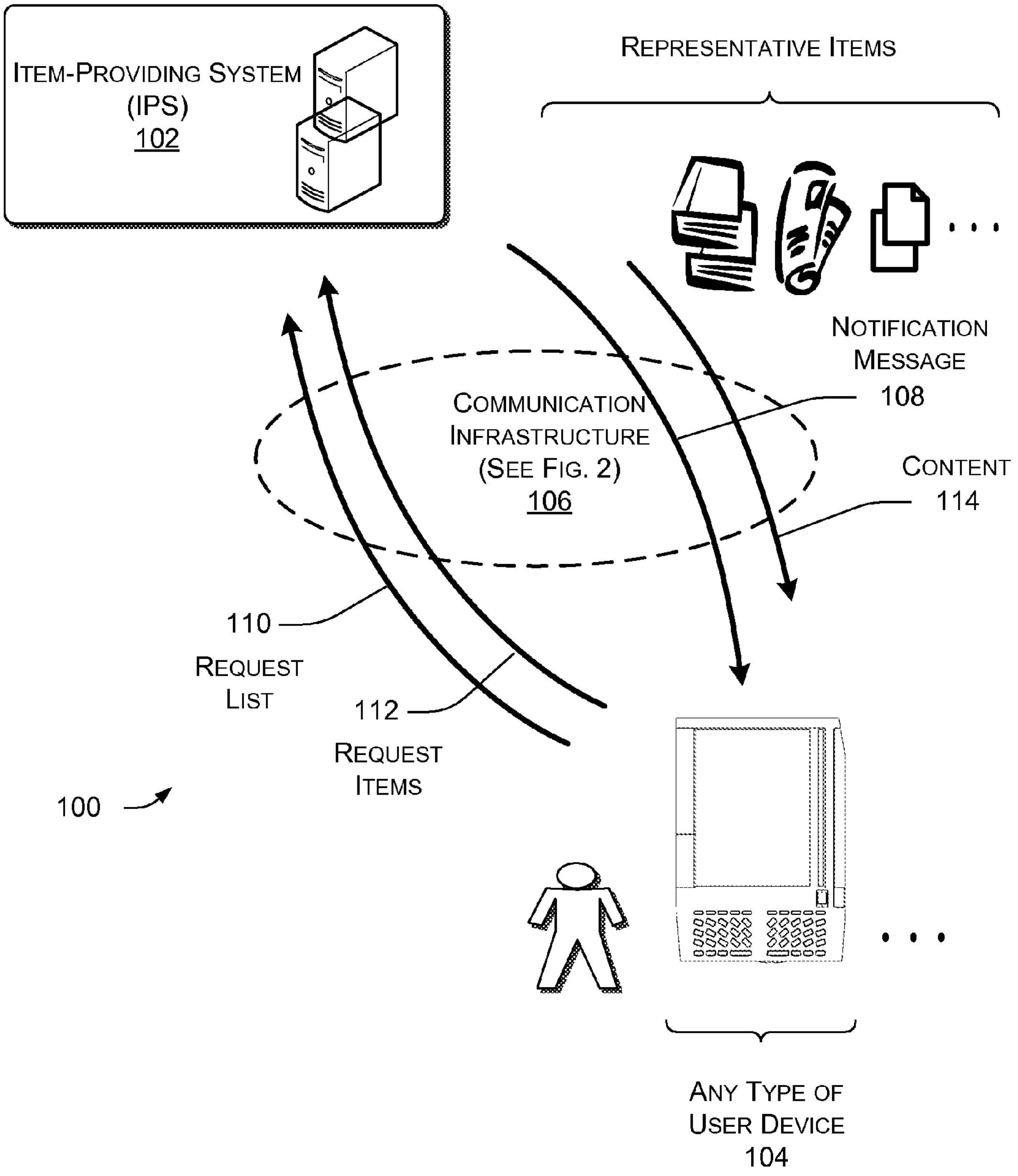
FIG. 1 is a block diagram illustrating a system for downloading items from an Item Providing System (IPS) to a user device.

A method for facilitating the creation and use of collections on an electronic device is disclosed. The method may include receiving user input related to the creation of collections of items that are stored on the electronic device. The method may also include creating the collections of items. The method may also include storing the collections of items on the electronic device. The method may further include backing up the collections to a backup server.

The electronic device may be an electronic book (eBook) reader, and at least some of the items in the collections may be eBooks. The backing up of the collections may occur in response to user input. Alternatively, the backing up of the collections may occur automatically.

The method may also include automatically creating at least one of the collections for the user of the electronic device. For example, the method may include automatically creating collections of items for use during a specified time period. As another example, the method may include automatically creating collections of items for keeping the user of the electronic device on a defined schedule. The method may further include sharing one or more of the collections with at least one user of another electronic device.

An electronic device that is configured to facilitate the creation and use of collections is disclosed. The electronic device includes a processor and memory in electronic communication with the processor. Instructions may be stored in the memory. The instructions may executable to receive user input related to the creation of collections of items that are stored on the electronic device. The instructions may also be executable to create the collections of items. The instructions may also be executable to store the collections of items on the electronic device. The instructions may also be executable to back up the collections to a backup server.

A computer-readable medium for facilitating the creation and use of collections on an electronic device is disclosed. The computer-readable medium may include executable instructions for receiving user input related to the creation of collections of items that are stored on the electronic device. The computer-readable medium may also include executable instructions for creating the collections of items. The computer-readable medium may also include executable instructions for storing the collections of items on the electronic device. The computer-readable medium may also include executable instructions for backing up the collections to a backup server.

An electronic device that is configured to facilitate the creation and use of collections is disclosed. The electronic device may include means for receiving user input related to the creation of collections of items that are stored on the electronic device. The electronic device may also include means for creating the collections of items. The electronic device may also include means for storing the collections of items on the electronic device. Further, the electronic device may include means for backing up the collections to a backup server.

According to one illustrative implementation, this disclosure sets forth functionality for downloading items to a user device. The functionality may be manifested in various systems, modules, computer readable media, data structures, methods, and other forms.

The "item" referenced above may correspond to any type of content. In one case, the item corresponds to a digital media item. The media item may include, without limitation, text content, image content, audio content, video content, hypertext protocol content, and so on, or any combination of these kinds of content. In addition, or alternatively, the item may include instruction-bearing content, such as machine readable program code, markup language content, script content, and so forth. For instance, an item may correspond to a software upgrade or the like.

More specifically, in one case, the term "item" may refer to a specific unit of merchandisable content, such as a book (e.g., an "eBook"), an issue of a magazine, and so on. Alternatively, an item may refer to smaller parts of a merchandisable unit, such as a chapter of a book or a song in an album. Alternatively, an item may refer to a larger compilation of component items which are related in any manner. For instance, an item may refer to multiple issues of a magazine in a particular year.

In general, the various features described in the implementations may be regarded as optional features, meaning that these features may be omitted or replaced with other features. Further, the various implementations described herein may be supplemented by adding additional features.

FIG. 1 is a block diagram illustrating a system 100 for downloading items from an Item Providing System (IPS) 102 to a user device 104. At the device 104, the user may consume the media items in electronic form, as opposed to traditional hard-copy form. Although not shown, the user device 104 represents one of a potentially great number of user devices.

As explained above, the term "item" has broad connotation. The following list, which is non-exhaustive, identifies representative types of items.

An item may correspond to an eBook item. An eBook item, in turn, may refer to a book in electronic form or to one or more portions of a book (such as a chapter of a book) or to a compilation of multiple books (such as a book series), and so on. An eBook is an example of a general class of items referred to herein as pre-generated items. The term pre-generated item refers to content typically (although not necessarily) provided to a user in response to the user's on-demand request for the content after it has been received and stored by the IPS 102.

An item of content may also correspond to a subscription-related item. A subscription-related item refers to any item the user receives based on a schedule or based on some other type of pre-established arrangement. Without limitation, representative forms of subscription-related items include magazines, journals, newspapers, newsletters, and so on. Other forms of subscription-related items include electronic feeds of various types, such as Really Simple Syndication (RSS) feeds, and so on. In contrast to a pre-generated item, a subscription-related item is typically provided to a user in response to the receipt of the item by the IPS 102, rather than the user's on-demand request for a pre-generated item.

An item may also correspond to a personal document item, or simply "personal item." A personal item refers to a document the user forwards in advance to the IPS 102, whereupon the IPS 102 converts the item to a device-readable format.

An item may also correspond to audio content, such as a piece of music, a collection of music, an audio book, and so on. An item may also correspond to a bundle of information generated in response to a query made by the user. An item may also correspond to instruction-bearing content, such as a software update. An item may also correspond to advertising material downloaded to the user device by any entity or combination of entities. Various rules may be applied to govern the downloading of this type of item.

An item may also correspond to a sample of a more complete version of the item. In one case, a sample-type item may embed one or more links to allow the user to acquire its full-version counterpart, or another part (e.g., chapter) of the item. In another case, a publisher or author may release an eBook or other item in a series of installments. Each installment may be regarded as an item.

The item-providing system (IPS) 102 corresponds to any functionality or combination of functionality for forwarding items to the user device 104. In one case, the IPS 102 may correspond to network-accessible server-based functionality, various data stores, and/or other data processing equipment. The IPS 102 may be implemented by a single collection of functionality provided at a single physical site. Alternatively, the IPS 102 may be implemented by multiple collections of functionality, optionally provided at plural physical sites. The IPS 102 may be administered by a single entity or plural entities.

In one case, the IPS 102 corresponds to an entity which provides items to users upon the users' purchase of the items. In this role, the IPS 102 may essentially act as a bookseller or the like. In one particular commercial environment, the IPS 102 may also offer services which allow users to purchase hard-copy books for physical delivery to the users; in this context, the IPS 102 may allow users to download electronic items to respective user devices as part of its entire suite of services. In other cases, the IPS 102 corresponds to an entity which provides items to users on a non-fee basis or on the basis of some other type of alternative compensation arrangement. Thus, the term "provider" of items should be construed broadly to encompass educational institutions, governmental organizations, libraries, non-profit organizations, and so on, or some cooperative combination of any two or more entities.

The user device 104 corresponds to any type of electronic processing device 104 for receiving items from the IPS 102. In one implementation, the user device 104 is readily portable, meaning the user may freely carry the user device 104 from one location to another. In one particular case, the user device is designed as a book reader device, also known as an eBook reader device. In this case, the user device 104 functions as the electronic counterpart of a paper-based book. The user may hold the user device 104 in a manner similar to a physical book; the user may electronically turn the pages of the book, and so on.

Without limitation, FIG. 1 illustrates a particular type of eBook reader device. Additional details regarding this particular type of reader device are provided below. Alternatively, the user device 104 may correspond to any other type of portable device, such as a portable music player, a personal digital assistant (PDA), a mobile telephone, a game module, a laptop computer, and so on, and/or any combination of these types of devices. Alternatively, or in addition, the user device 104 may correspond to a device which is not readily portable, such as a personal computer, a set-top box associated with a television, a gaming console, and so on.

A communication infrastructure 106 bi-directionally couples the IPS 102 to the user device 104. Namely, the IPS 102 downloads items, upgrades, and/or other information to the user device 104 via the communication infrastructure 106. The IPS 102 receives various instructions and other data from the user device 104 via the communication infrastructure 106.

The communication infrastructure 106 may include any combination of communication functionality, including any combination of hardwired links and/or wireless links, etc. For instance, FIG. 2 (to be discussed below in turn) shows one implementation of the communication infrastructure 106 which includes a combination of a wide area network (WAN) and wireless infrastructure. By virtue of the wireless component of the communication infrastructure 106, the user may use the user device 104 to purchase items and consume items without being tethered to the IPS 102 via hardwired links. Thus, for instance, a user may purchase and consume an eBook using the device while riding in a car as a passenger, while hiking in a park, while boating on a lake, and so forth.

FIG. 1 shows four exchanges which describe, in very high-level form, part of a procedure for downloading items to the user. In a first message 108, the IPS 102 may send a notification message to the user device 104. The notification message 108 instructs the user device 104 to download one or more items from the IPS 102 and/or perform other actions. In a second message 110, the user device 104 requests the IPS 102 to supply a list which identifies one or more items to be downloaded (and/or other actions to be performed, such as, in one case, sending information back to the IPS 102).

The user device 104 receives the list from the IPS 102 in response to the second message 110 (note FIG. 1 does not specifically identify the transmission of the list from the IPS 102 to the user device 104). If the instructions identify items to be downloaded, in a third message 112, the user device 104 sends a request to the IPS 102, asking the IPS 102 to download the items identified in the list. In a fourth message 114, the IPS 102 downloads the requested items to the user device 104. In effect, the user device 104 retrieves the items using a pull approach, but the pull approach is initiated by a push operation (by virtue of the IPS 102 "pushing" a notification message 108 to the user device 104).

Figure 2:
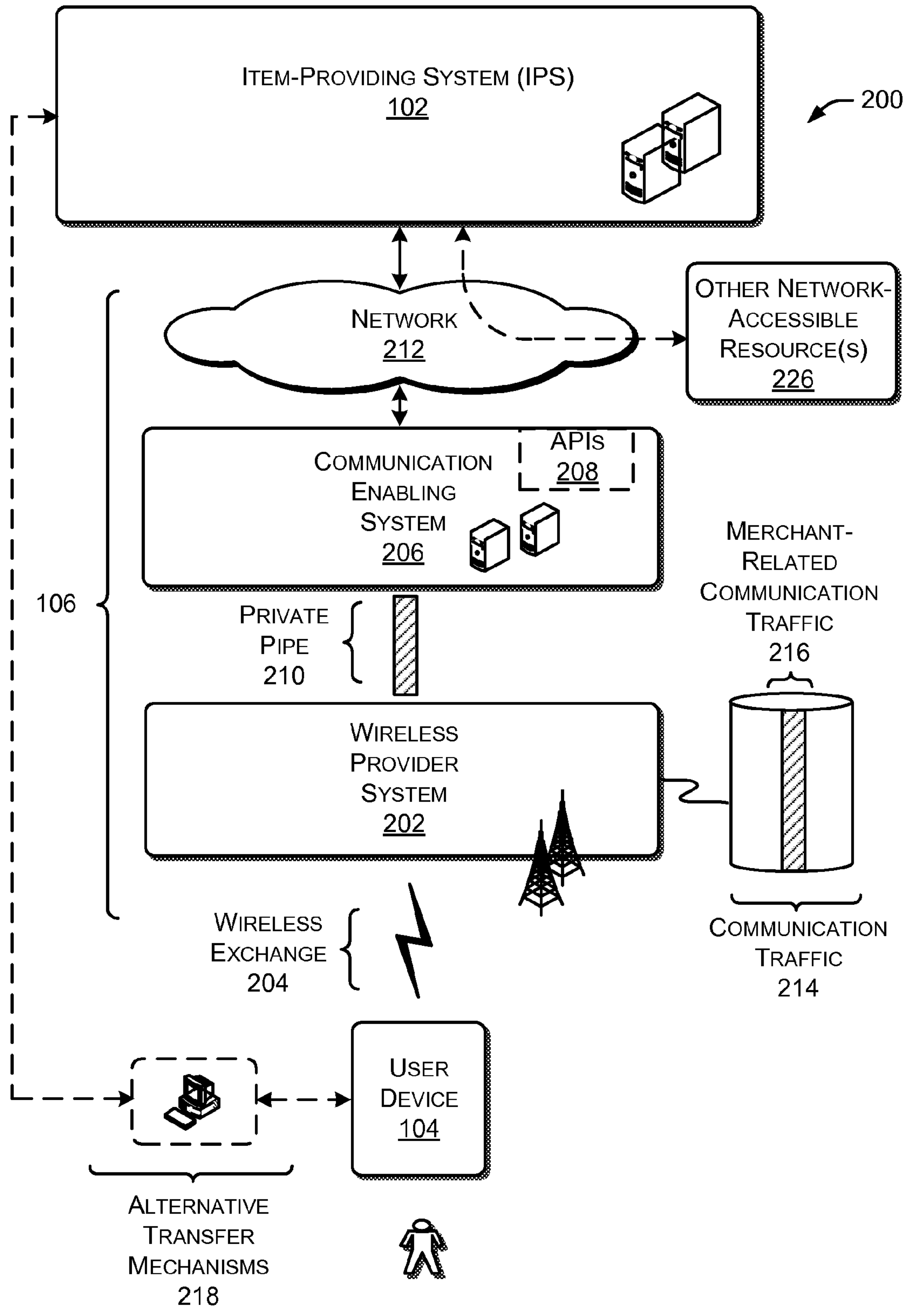
FIG. 2 shows a system which represents one illustrative implementation of the general system of FIG. 1.

FIG. 2 shows a system 200 which represents one illustrative implementation of the general system 100 of FIG. 1. By way of overview, the system 200 includes the components identified above, namely IPS 102 coupled to a user device 104 via communication infrastructure 106.

The communication infrastructure 106 may include multiple components. A first component may be a wireless provider system 202. The wireless provider system 202 corresponds to any infrastructure for providing a wireless exchange 204 with the user device 104. In one case, the wireless provider system 202 is implemented using various data processing equipment, communication towers, and so forth (not shown).

Alternatively, or in addition, the wireless provider system 202 may rely on satellite technology to exchange information with the user device 104. The wireless provider system 202 may use any form of electromagnetic energy to transfer signals, such as, without limitation, radio-wave signals. The wireless provider system 202 may use any communication technology to transfer signals, such as, without limitation, spread spectrum technology, implemented, for instance, using the Code Division Multiple Access (CDMA) protocol. The wireless provider system 202 may be administered by a single entity or by a cooperative combination of multiple entities.

The communication infrastructure 106 may also include a communication-enabling system 206. One purpose of the communication-enabling system 206 is to serve as an intermediary in passing information between the IPS 102 and the wireless provider system 202. The communication-enabling system 210 may be implemented in any manner, such as, without limitation, by one or more server-type computers, data stores, and/or other data processing equipment.

The communication-enabling system 206 may communicate with the wireless provider system 202 via a dedicated channel 210, also referred to as a dedicated communication pipe or private pipe. The channel 210 is dedicated in the sense it is exclusively used to transfer information between the communication-enabling system 206 and the wireless provider system 202. In contrast, the communication enabling system 206 communicates with the IPS 102 via a non-dedicated communication mechanism, such as a public Wide Area Network (WAN) 212. For example, the WAN 212 may represent the Internet.

The users may access the IPS 102 through alternative communication routes which bypass the wireless provider system 202. For instance, as indicated by alternative access path 218, a user may use a personal computer or the like to access the IPS 102 via the wide area network 212, circumventing the wireless provider system 202 and the communication-enabling system 206. The user may download items through this route in conventional fashion. The user may then transfer the items from the personal computer to the user device 104, e.g., via a Universal Serial Bus (USB) transfer mechanism, through the manual transfer of a portable memory device, and so on. This mode of transfer may be particularly appropriate for large files, such as audio books and the like. Transferring such a large amount of data in wireless fashion may have a relatively high cost. However, the system 200 may also be configured to transfer large files (such as audio files) via the wireless exchange 204.

Figure 3:
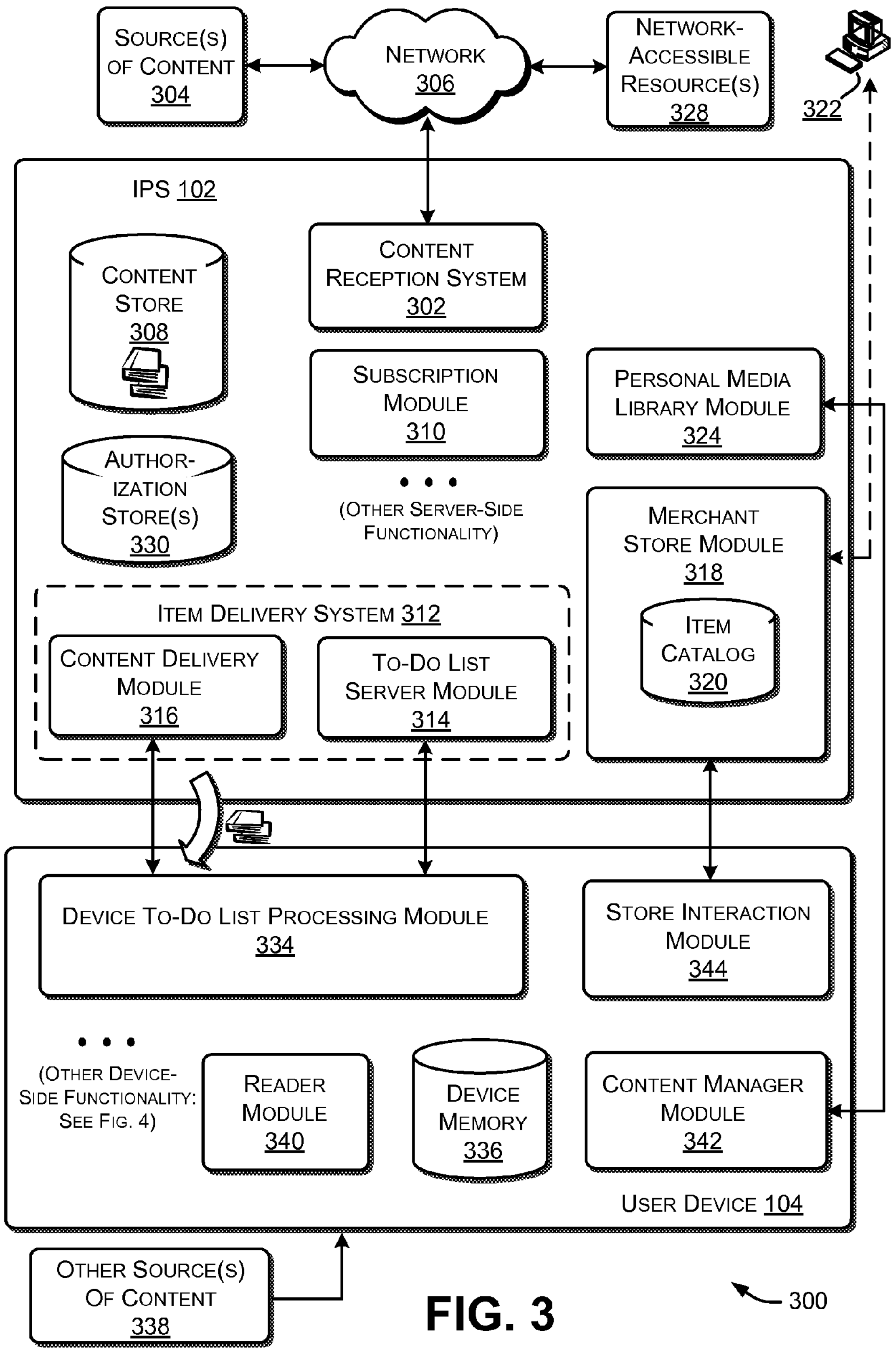
FIG. 3 shows a system including a more detailed depiction of the IPS and the user device.

FIG. 3 shows a system 300 including a more detailed depiction of the IPS 102 and the user device 104 (which were introduced in FIGS. 1 and 2). Although not shown, the system 300 shown in FIG. 3 may use the wireless features shown in FIG. 2.

In another implementation, the system 300 may use some other communication infrastructure than is shown in FIG. 2, which may optionally omit the use of wireless communication.

Addressing the details of the IPS 102 first, this system 102 performs various functions. Different modules are associated with these different functions. One module is a content reception system 302. The content reception system 302 receives content from one or more sources of content 304. The sources 304 may represent any type of provider of content, such as eBook publishers, newspaper publishers, other publishers of periodicals, various feed sources, music sources, and so on.

The sources 304 may be administered by a single entity or may be administered by separate respective entities. Further, the entity administering the IPS 102 may correspond to a same entity which administers one or more of the sources 304. Alternatively, or in addition, the entity administering the IPS 102 may interact with one or more different entities administering one or more respective sources 304. In the latter case, the entity administering the IPS 102 may enter into an agreement with the source entities to receive content from these source entities.

In the above example, the entities associated with the sources 304 may correspond to commercial organizations or other types of organizations. In another case, one or more of the sources may correspond to individual users, such as the creators of the items. For example, a user may directly provide items to the IPS 102. Alternatively, or in addition, a user may supply content to a community repository of items, and the IPS 102 may receive content from this repository, and so on.

The content reception system 302 may obtain the content through various mechanisms. In one case, the content reception system 302 obtains the content via one or more networks 306. The networks 306 may represent a WAN, such as the Internet, a Local Area Network (LAN), or some combination thereof. The content reception system 302 may receive the information in various forms using any protocol or combination of protocols. For instance, the content reception system 302 may receive the information by making a Hypertext Transfer Protocol (HTTP) request, by making a File Transfer Protocol (FTP) request, by receiving a feed (e.g., an RSS feed), and so forth.

In another case, the IPS 102 may obtain content via a peer-to-peer (P2P) network of sources 304. More generally, the content reception system 302 may proactively request the content in an on-demand manner (based on a pull method of information transfer). Or the content reception system 302 may receive the content in response to independent transfer operations initiated and performed by the sources 304 (based on a push method of information transfer). Alternatively, the content reception system 302 may use a combination of pull and push transfer mechanisms to receive the content.

The content reception system 302 may receive content in the form of items. Without limitation, the items may include eBooks, audio books, music, magazine issues, journal issues, newspaper editions, various feeds, and so forth. In one case, the content reception system 302 may receive some items expressed in a format not readable by the user device 104 (where the user device may optionally be configured to receive, process, and present content expressed in one or more predefined formats). To address this situation, the content reception system 302 may convert the items from their original format into a device-readable format (such as, without limitation, the .mobi format).

The content reception system 302 stores the items received (and optionally converts them to another format) in a content store 308. The content store 308 includes one or more storage systems for retaining items in electronic form, located at a single site or distributed over plural sites, administered by one or more entities.

The IPS 102 also includes a subscription module 310. The subscription module 310 manages users' subscriptions to subscription-related items. Generally, a subscription entitles a user to receive one or more subscription-related items (which are yet to be received and stored by the content reception system 302) based on any type of consideration or combination of considerations. Without limitation, subscription-related item types include magazines, journals, newsletters, newspapers, various feeds, and so forth. Users may arrange to receive subscription-related items by purchasing such subscriptions, or, more generally, by registering to receive such subscriptions (which, in some cases, may not involve the payment of a fee).

Alternatively, or in addition, the IPS 102 may automatically register users to receive subscription-related items without the involvement of the users (and possibly without the approval of the users). The latter scenario may be appropriate in the case in which the IPS 102 (or some other entity) registers a user to receive unsolicited advertisements, newsletters, and so on. The system 300 may allow the user to opt out of receiving such unsolicited information.

The IPS 102 may consult the subscription module 310 to determine which user devices should receive a newly-received subscription-related item. For instance, upon receiving an electronic issue of the magazine Forbes, the IPS 102 consults the subscription module 310 to determine the users who have paid to receive this magazine. The IPS 102 then sends the issue to the appropriate user devices.

An item delivery system 312 represents the functionality which actually performs the transfer of content to the user device 104. In one illustrative representation, the item-delivery system 312 includes two components: a to-do list server module 314 and a content delivery module 316. The to-do list server module 314 generally provides instructions for the user device 104. The instructions direct the user device 104 to retrieve items and perform other operations. The content delivery module 316 allows the user device 104 to obtain the items identified in the instructions received from the to-do list server module 314.

More specifically, in a first phase of information retrieval, the to-do list server module 314 sends a notification message to the user device 104. The user device 104 responds to the notification message by waking up (if "asleep"), which may involve switching from a first power state to a second power state (where the second power state consumes more power than the first power state).

The user device 104 may then contact the to-do list server module 314 to request instructions from the to-do list server module 314. More specifically, for each user device, the to-do list server module 314 maintains a list of entries, also referred to herein as a "to-do queue." An entry provides an instruction for a user device to perform an action. As will be described in greater detail below, there are different instructions that a device may be directed to perform, wherein a collection of instructions defines an IPS-device interaction protocol. One such action (e.g., associated with a GET instruction of the protocol) directs the user device 104 to retrieve an item from a specified location by specifying an appropriate network address (e.g., a URL) and appropriate arguments.

In a first phase of the downloading procedure, the user device 104 may retrieve n such entries, wherein n is an integer. In one scenario, the number n may be a subset of a total number of items in the to-do queue associated with the user device 104. In a second phase of the downloading procedure, the user device 104 may contact the content delivery module 316 to retrieve one or more items identified in the GET-related entries.

In general, after receiving the notification message, the item delivery system 312 may interact with the user device 104 in a data mode, e.g., using the Hypertext Transfer Protocol (HTTP), or some other protocol or combination of protocols.

The IPS 102 may also include a merchant store module 318. The merchant store module 318 may provide access to an item catalog 320, which, in turn, may provide information regarding a plurality of items (such as eBooks, audio books, subscription related items, and so on). As will be described in greater detail below, the merchant store module 318 may include functionality allowing a user to search and browse though the item catalog 320. The merchant store module 318 may also include functionality allowing a user to purchase items (or, more generally, acquire items based on any terms).

In one case, a user may interact with the merchant store module 318 via the user device 104 using wireless communication. Alternatively, or in addition, the user may interact with the merchant store module 318 via another type of device 322, such as a personal computer, optionally via wired links. In either case, when the user purchases or otherwise acquires an item via the merchant store module 318, the IPS 102 may invoke the item delivery system 312 to deliver the item to the user.

The IPS 102 may also include a personal media library module 324. The personal media library module 324 may store, for each user, a list of the user's prior purchases. More specifically, in one case, the personal media library module 324 may provide metadata information regarding eBook items and other on-demand selections (e.g., "a la carte" selections, such as subscription issues, etc.) which a user already owns. The personal media library module 324 may also provide links to the items in the content store 308. As will be described in greater detail below, to download an eBook item (or the like) which the user has already purchased, the user device 104 contacts the content delivery module 316.

The content delivery module 316 may interact with permission information and linking information in the personal media library module 324 in order to download the item to the user. In one use scenario, the user device 104 may access the content delivery module 316 in this manner to initiate downloading of an item which has been previously purchased by the user but has been deleted by the user device 104 for any reason.

The IPS 102 may also include various security-related features, such as one or more authorization stores 330. The authorization stores 330 may provide information which enables various components of the IPS 102 to determine whether to allow the user to perform various functions, such as access the merchant store module 318, download items, change settings, and so on.

The above-enumerated list of modules is representative and is not exhaustive of the types of functions performed by the IPS 102. As indicated by the label "Other Server-Side Functionality," the IPS 102 may include additional functions, many of which are described below.

Now turning to the device-side features of the system 300, the user device 104 may include a device to-do list processing module 334. The purpose of the device to do list processing module 334 may be to interact with the item delivery system 312 to download items from the item delivery system 312. Namely, in a first phase of the downloading procedure, the device to-do list processing module 334 may first receive a notification message from the to-do list server module 314, which prompts it to wake up (if "asleep") and contact the to-do list server module 314 to retrieve a set of n entries.

Each entry may include an instruction which directs the device to-do list processing module 334 to perform an action. In a second phase, for a GET-type entry, the device to-do list processing module 334 may contact the content delivery module 316 to request and retrieve an item identified by the GET-type entry. As will be described in greater detail below, the user device 104 may signal a successful completion of the download process or a failure in the download process.

Upon downloading an item, the user device 104 may store the item in a device side memory 336, which in one example is a flash-type memory and may be any other type of memory in other examples. Although not shown, the user device 104 may also exchange information with any other source of content 338. In one illustrative case, the other source of content 338 may represent a personal computer or other data processing device. Such other source of content 338 may transfer an item to the user device 104 via a Universal Serial Bus (USB) connection and/or any other type(s) of connection(s). In this scenario, the other source of content 338, in turn, may receive the item from the IPS 102 (or other source) via hardwired connection (e.g., non-wireless connection). For example, to receive an audio book, the user may use a personal computer to non-wirelessly download the audio book from a network-accessible source of such content. The user may then transfer the audio book to the user device 104 via USB connection. In another illustrative case, the other source of content 338 may represent a portable memory module of any type, such as a flash type memory module, a magnetic memory module, an optical memory module, and so on.

The user device 104 may also include a reader module 340. The illustrative purpose of the reader module 340 is to present media items for consumption by the user using the user device 104. For example, the reader module 340 may be used to display an eBook to the user to provide a user experience which simulates the reading of a paper-based physical book.

The user device 104 may also include a content manager module 342. The purpose of the content manager module 342 is to allow the user to manage items available for consumption using the user device 104. For example, the content manager module 342 may allow the user to view a list of items available for consumption.

The content manager module 342 may also identify the sources of respective items: one such source corresponds to the device memory 336; another source corresponds to an attached portable memory (e.g., represented by the other source 338); another source corresponds to items identified in the personal media library module 324 (as may be revealed, in turn, by device-side metadata provided by the IPS 102); another source corresponds to subscription-related items identified by the subscription module 310, and so on. The content manager module 342 may allow the user to filter and sort the items in various ways. For example, the user may selectively view items which originate from the device store 336.

The user device 104 may also include a store interaction module 344. The store interaction module 344 may allow the user device 104 to interact with the merchant store module 318. The user may engage the store interaction module 344 to search and browse through items, to purchase items, to read and author customer reviews, and so on. As described above, the user may also use a personal computer or the like to interact with the merchant store module 318 via hardwired links.

Figure 4:
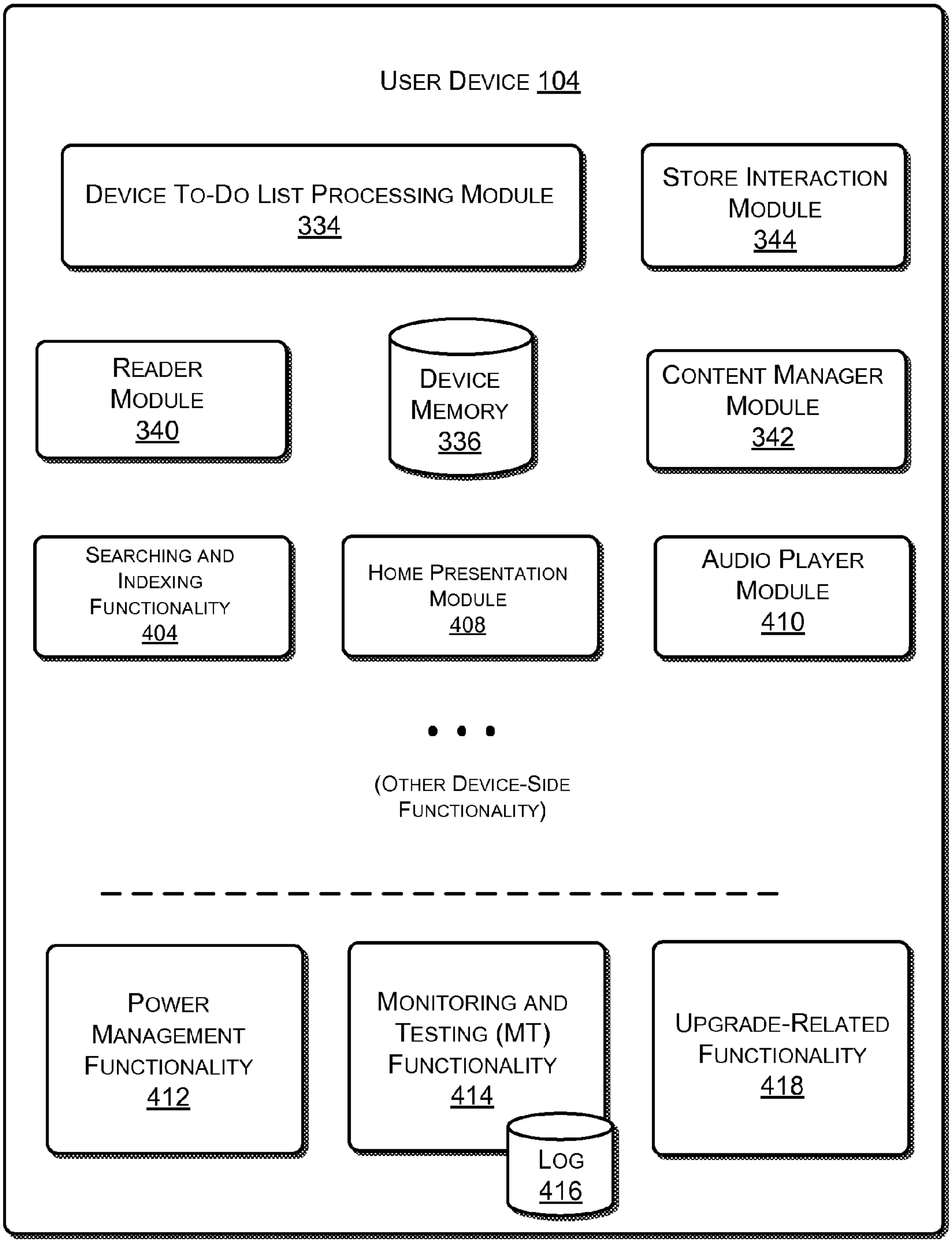
FIG. 4 shows one configuration of the user device.

The above-enumerated list of modules is representative and is not exhaustive of the types of functions performed by the user device 104. As indicated by the label "Other Device-Side Functionality," the user device 104 may include additional functions, many of which are described below. In fact, FIG. 4 shows additional device-side functionality. For completeness, FIG. 4 also identifies the various modules described above, including the device to-do list processing module 334, the device memory 336, the reader module 340, the content manager module 342, and the store interaction module 344. These features perform the functions described above.

FIG. 4 shows one configuration of the user device 104. The user device 104 may include searching and indexing functionality 404. The indexing aspect of this functionality 404 provides a mechanism for indexing an item received from the IPS 102 and/or for interacting with an index generated and supplied by the IPS 102 or by some other source. An index for a particular item (such as an eBook or newspaper edition) identifies the component parts (e.g., words) in the item, linking the component parts to their respective locations in the item. The searching aspect of the functionality 404 provides a mechanism for searching for identified components (e.g., words, phrases, etc.) in an item, and for performing other search-related functions. The searching aspect relies on the indexing aspect.

The user device 104 may also include a home presentation module 408. The home presentation module 408 may provide a home page when the user first turns on the user device and/or at other junctures. The home page may act as a general portal allowing a user to access media items and various features provided by the user device 104. In one illustrative case, the home page may present a summary of some (or all) of the items available for consumption using the user device 104.

The user device 104 may also include an audio play module 410. The audio player module 410 may provide an interface which allows the user to play back and interact with audio items, such as music, audio books and the like.

The above-described features of the user device 104 may pertain to applications with which the user may interact or which otherwise play a high-level role in the user's interaction with the user device 104. The user device 104 may include a number of other features to perform various lower-level tasks, possibly as background-type operations.

Power management functionality 412 performs one such background-type operation. More specifically, the power management functionality 412 corresponds to a collection of hardware and/or software features operating to manage the power consumed by the user device 104. The power management functionality 412 generally operates to reduce the power consumed by the device 104. The power management functionality 412 achieves this goal by selectively powering down features not actively being used (or for which there is an assumption these features are not actively being used). The power management functionality 412 achieves particularly noteworthy power savings by powering down features which make large power demands, such as one or more features associated with wireless communication.

The user device 104 may also include performance Monitoring and Testing (MT) functionality 414. The MT functionality 414 maintains a performance log 416 identifying the behavior of the device 104. The IPS 102 and/or other entities may access the performance log 416, along with other information gleaned from the communication infrastructure 106, to help diagnose anomalies in the operation of the user device 104 and the system 300 as a whole. The MT functionality 414 may also interact with testing functionality provided by the IPS 102 and/or other entities. For example, the MT functionality 414 may respond to test probes generated by the IPS 102.

The user device 104 may also include an upgrade-related functionality 418. The upgrade-related functionality 418 allows the user device 104 to receive and integrate instruction-bearing update items (such as software updates). In one case, the upgrade-related functionality 418 may automatically receive instruction-bearing items provided by the IPS 102 (and/or by other entities). An administrator at the IPS 102 may manually initiate the upgrade procedure by which an instruction-bearing update item is forwarded to the user device 104. Or an automated IPS-side routine may initiate the upgrade procedure. In any event, the user device may receive the instruction-bearing update item without the involvement of the user or with minimal involvement from the user. In this sense, the upgrade procedure may be viewed as “transparent.” In another case, the upgrade-related functionality 418 may be operated by the user to manually access a source of instruction-bearing items (such as a prescribed website or the like) and download an item from this source.

To repeat, the above-enumerated list of modules is representative and is not exhaustive of the types of functions performed by the user device 104. As indicated by the label “Other Device-Side Functionality,” the user device 104 may include additional functions.

The IPS 102 described above may interact with any type of user device 104. In one case, the user device 104 is a portable-type device, meaning a device designed to be readily carried from location to location. In one specific case, the user device 104 allows the user to consume the media items while holding the user device 104, e.g., in a manner which simulates the way a user might hold a physical book. A portable user device may take the form of an eBook reader device, a portable music player, a personal digital assistant, a mobile telephone, a game module, a laptop computer, and so forth, and/or any combination of these types of devices. Alternatively, or in addition, the user device 104 may correspond to a device not readily portable, such as a personal computer, set-top box associated with a television, gaming console, and so on.

Figure 5:
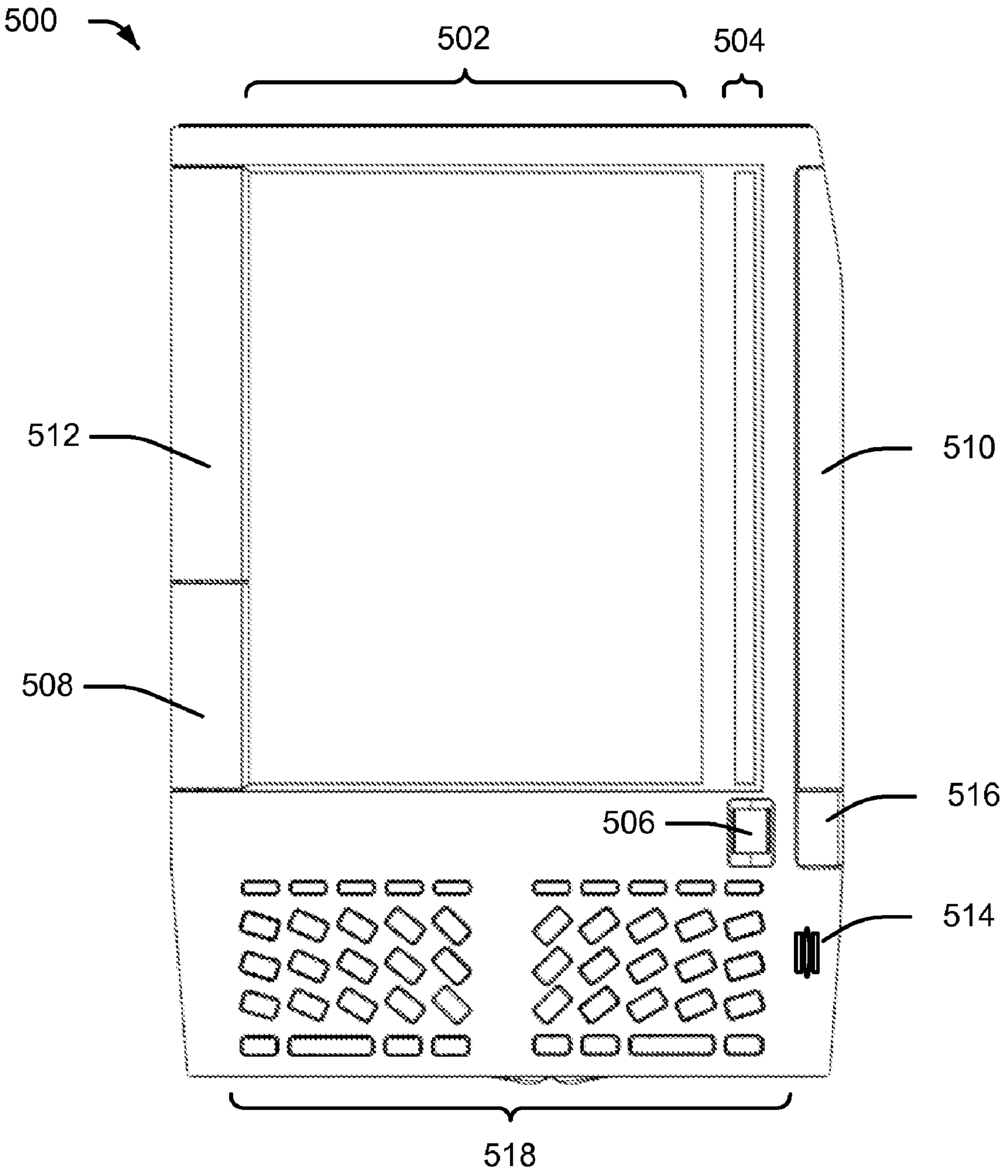
FIG. 5 shows one type of user device which may be used to interact with the IPS.

Without limitation, FIG. 5 shows one type of user device 500 which may be used to interact with the IPS 102. The user device 500 may include a wedge-shaped body designed to fit easily in the hands of a user, generally having the size of a paperback book. Other user devices may adopt different shapes and sizes.

In one representative design, the user device 500 includes two display parts: a main display part 502 and a supplemental display part 504. The main display part 502 presents various pages provided by the store interaction module 344, the reader module 340, and so on. In one case, the supplemental display part 504 is used to present a cursor. The user may position the cursor to identify laterally adjacent portions in the main display part 502. Without limitation, in one illustrative case, the main display part 502 and/or the supplemental display part 504 may be implemented using electronic paper technology, such as provided by E Ink Corporation of Cambridge, Mass. This technology presents information using a non-volatile mechanism; using this technology, the user device 500 may retain information on its display even when the device is powered off.

The user device 500 includes various input keys and mechanisms. A cursor-movement mechanism 506 allows a user to move a cursor within the supplemental display part 504. In one representative case, the cursor-movement mechanism 506 may include a cursor wheel that may be rotated to move a cursor up and down within the supplemental display part 504. The cursor-movement mechanism 506 may be configured to allow the user to make a selection by pressing down the wheel. Other types of selection mechanisms may be used, such as a touch-sensitive display, a series of vertically and/or horizontally arrayed keys along the edge(s) of the main display part 502, one or more graphical scroll bar(s) in the main display part 502, and so on.

The user device 500 also includes various page-turning buttons, such as next page buttons (508, 510) and a previous page button 512. The next page buttons (508, 510) advance the user to a next page in an item (relative to a page that is currently being displayed). The previous page 512 button advances the user to a previous page in an item (relative to a page that is currently being displayed). The user device 500 may also include a page-turning input mechanism 514 actuated by the user’s thumb as it passes over the mechanism 514. This user experience simulates the manner in which a user turns a page in a physical book (e.g., by “thumbing through” a book). The user device 500 may also include a back button 516 allowing the user to advance to a previous page when using the browsing module 402. Although not shown, the user device 500 may include a switch for turning power on and off, a switch for enabling and disabling a wireless interface, and so on. The user device 500 may also include a keyboard 518. The keyboard 518 may include alphanumeric keys. The keys may be shaped and oriented in a manner which facilitates the user’s interaction with the keys while the user holds the device 104 in the manner of a physical book. The user may use the keyboard 518 to enter search terms, annotations, URLs, and so forth. The user may also use the keyboard 518 to respond to testing content. The keyboard 518 may also include various special-function keys.

Figure 6:
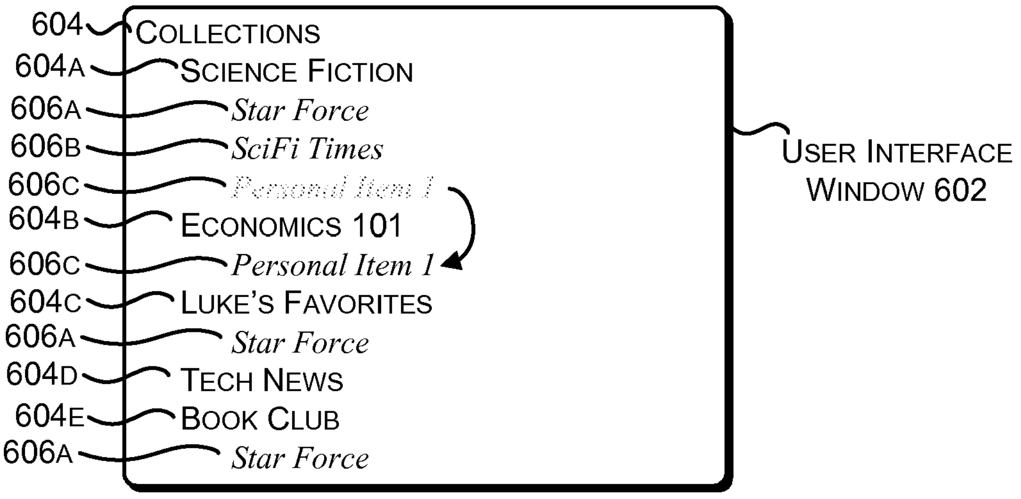
FIG. 6 illustrates an example showing how collections may be displayed on a user device.

Reference is now made to FIG. 6. FIG. 6 illustrates an example showing how collections 604 may be displayed on a user device 500.

A user interface window 602 is shown. The user interface window 602 may be displayed in the main display part 502 of a user device 500. In the user interface window 602 there is a list of collections 604. The list of collections 604 illustrates examples of possible collections 604 that a user may have on a user device 500.

The list of collections 604 includes a collection 604*a* called Science Fiction. This illustrates that a user may create a collection 604 for a category of items 606 that the user enjoys reading, listening to, etc.

In the example shown in FIG. 6, the Science Fiction collection 604*a* includes an eBook 606*a* (called “Star Force” in this example), a subscription-related item 606*b* (called “Science Fiction Times” in this example), and a personal item 606*c* (called “Personal Item 1” in this example). This illustrates that a collection 604 may include different types of items 606. As indicated above, an item 606 may be a specific unit of merchandisable content (e.g., an eBook, an issue of a magazine, etc.). Alternatively, an item 606 may be a smaller part of a merchandisable unit (e.g., a chapter of an eBook, an article in a magazine, etc.).

The list of collections 604 also includes a collection 604*b* called Economics 101. This illustrates that a user may create a collection 604 for a class that the user is taking. The items 606 in such a collection 604 may correspond to reading materials from the class.

The list of collections 604 also includes a collection 604*c* called Luke’s Favorites. This illustrates that a user may receive a collection 604 from a friend. Thus, collections 604 may be shared among multiple people.

The list of collections 604 also includes a collection 604*d* called Tech News. This illustrates that a collection 604 may include news-related items 606 that are updated on a regular basis. The items 606 in a particular collection 604, such as the Tech News collection 604*d*, may be updated automatically and/or they may be updated by the user.

The list of collections 604 also includes a collection 604*e* called Book Club. This illustrates that a user may participate in a book club, and the ability of the user device 500 to create collections 604 may enhance participation in the book club. The items in the Book Club collection 604*e* may correspond to items 606 that are being read (or listened to, etc.) by members of the book club.

FIG. 6 also illustrates that the same item can be included in multiple collections. In particular, the eBook 606*a* called “Star Force” is shown in the Science Fiction collection 604*a*, the Luke’s Favorites collection 604*c*, and the Book Club collection 604*e*.

FIG. 6 also illustrates that an item 606 can be moved from one collection 604 to another. For example, the item 606*c* called “Personal Item 1” is shown being moved from the Science Fiction collection 604*a* to the Economics 101 collection 604*b*. This illustrates that collections 604 are not static, and can change over time.

FIG. 6 illustrates just one possible way that collections 604 may be displayed on a user device 500. There are many other ways that this may be done in accordance with the present disclosure. For example, instead of displaying the names of collections 604, collections 604 may be represented in graphical form (e.g., a picture of a famous science fiction character may be displayed to represent the Science Fiction collection 604*a*). As another example, although the list of collections 604 occupies most of the space in the user interface window 602 shown in FIG. 6, the list of collections 604 may alternatively occupy a much smaller amount of space in the user interface window 602. This may permit other content (e.g., the content of an item 606, such as an eBook 606*a*) to be prominently displayed in the user interface window 602. Also, although just a single level of collections 604 is shown in FIG. 6, the user device 500 may permit the user to create sub-collections (e.g., the Science Fiction collection 604*a* may include a Star Trek sub-collection and a Star Wars sub-collection). The example shown in FIG. 6 should not be construed as limiting the scope of the present disclosure.

Figure 7:
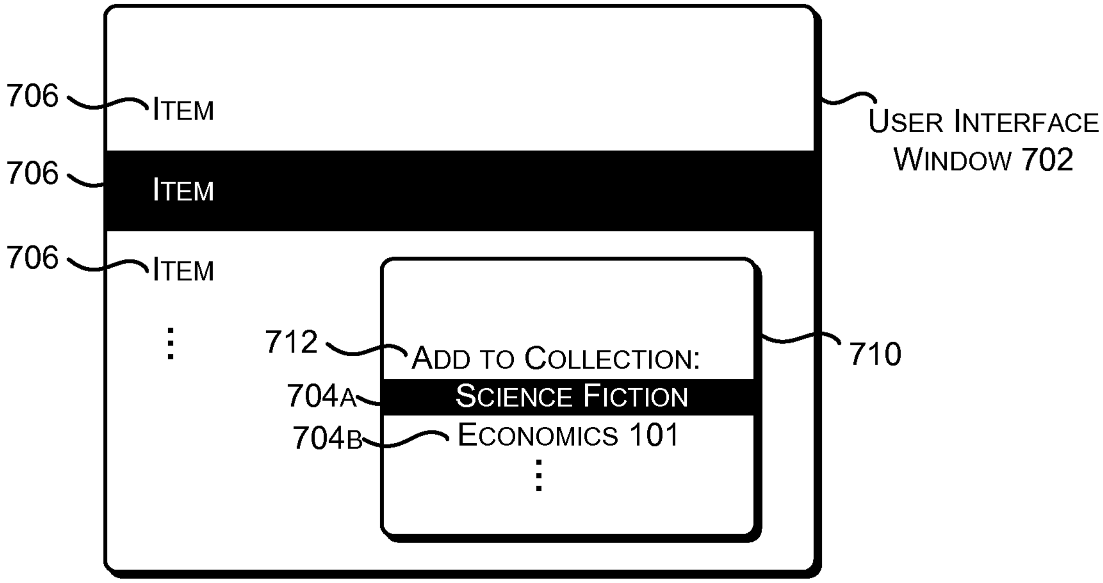
FIG. 7 illustrates an example showing how a user may add an item to a collection.

Reference is now made to FIG. 7. FIG. 7 illustrates an example showing how a user may add an item 706 to a collection 704. As indicated above, an item 706 may be a specific unit of merchandisable content (e.g., an eBook, an issue of a magazine, etc.). Alternatively, an item 706 may be a smaller part of a merchandisable unit (e.g., a chapter of an eBook, an article in a magazine, etc.).

A user interface window 702 is shown. The user interface window 702 may be displayed in the main display part 502 of a user device 500. Inside the user interface window 702, multiple items 706 are shown. A user device 500 may be configured to display a list of all of the items 706 that are stored on the user device 500, as shown in FIG. 7.

To add an item 706 to a collection 704, a user may select the item 706 that is to be added. When an item 706 is selected, the selected item 706 may be highlighted. In response to an item 706 being selected, a pop-up window 710 may be displayed. Inside the pop-up window 710, there may be a list of the collections 704 that have been created on the user device 500. For example, in the pop-up window 710 that is shown in FIG. 7, there is a heading 712 called Add To Collection 712. Underneath this heading 712, there is a list of the collections 704 on the user device 500 (e.g., a Science Fiction collection 704*a*, an Economics 101 collection 704*b*, etc.). A user may select the collection 704 to which the selected item 706 is to be added. For example, the Science Fiction collection 704*a* is shown selected in FIG. 7.

FIG. 7 illustrates just one possible way that a user may add an item 706 to a collection 704. There are many other ways that this may be done in accordance with the present disclosure. For example, a user interface element (e.g., a button, check box, etc.) may be displayed next to each of the items 706 in the list. As another example, a user may be permitted to add an item 706 to a collection 704 while the user is reading (or listening to, etc.) the item 704. Also, although FIG. 7 shows just a single item 706 being added to a collection 704, a user may be permitted to add multiple items 706 to a collection 704. The example shown in FIG. 7 should not be construed as limiting the scope of the present disclosure.

Figure 8:
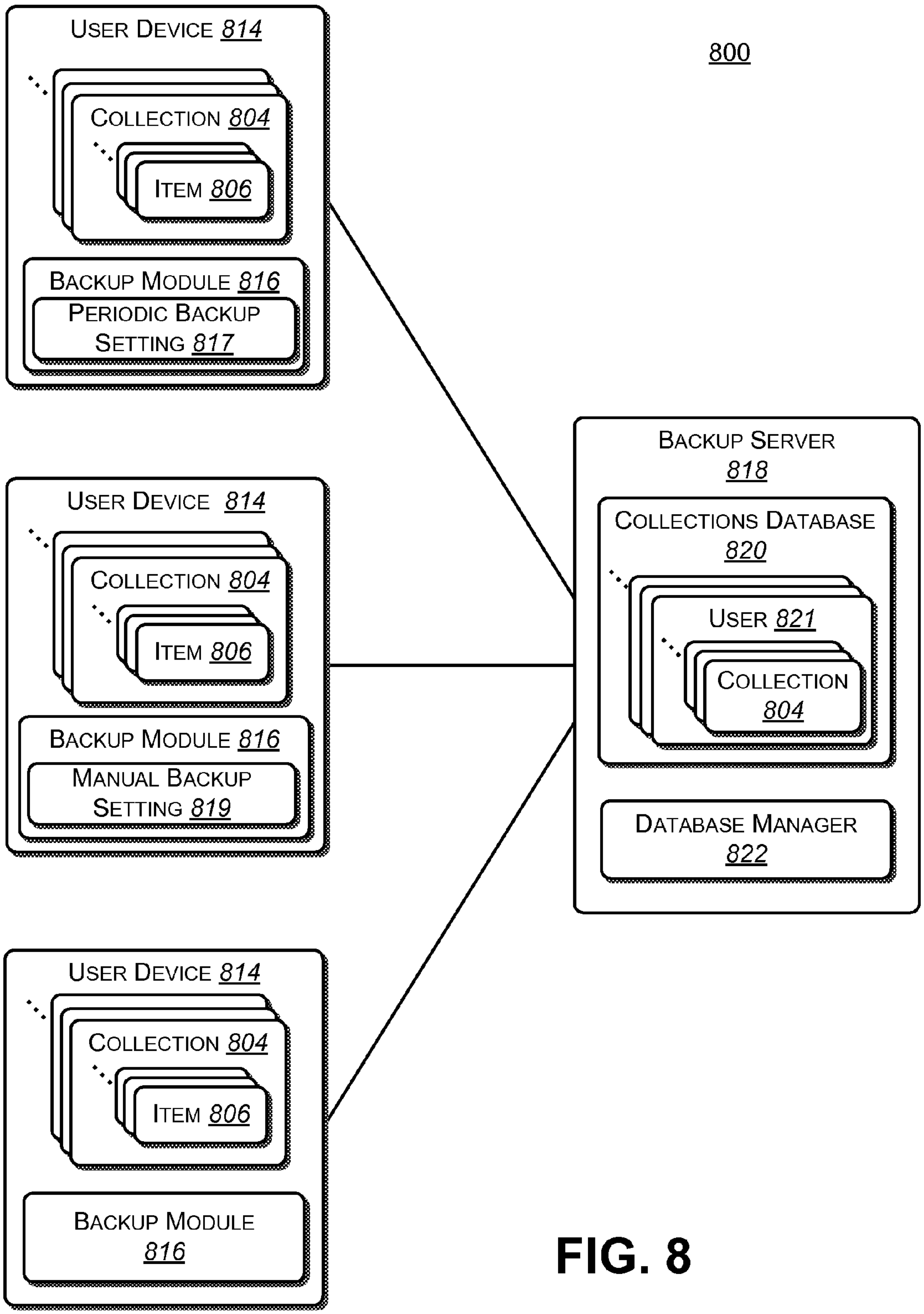
FIG. 8 illustrates an example of a system for backing up collections to a backup server.

Reference is now made to FIG. 8. FIG. 8 illustrates an example of a system 800 for backing up collections 804 to a backup server 818.

Multiple user devices 814 are shown. Some or all of the user devices 814 may be configured similarly to the user device 500 that is shown in FIG. 5. On each user device 814, multiple collections 804 are shown. Each collection 804 may include multiple items 806. As indicated above, an item 806 may be a specific unit of merchandisable content (e.g., an eBook, an issue of a magazine, etc.). Alternatively, an item 806 may be a smaller part of a merchandisable unit (e.g., a chapter of an eBook, an article in a magazine, etc.).

Each user device 814 may also include a backup module 816. The backup module 816 on a particular user device 814 may be configured to backup the collections 804 that are stored on that user device 814 to a backup server 818.

The backing up of collections 804 to a backup server 818 may occur in response to user input. One of the backup modules 816 in FIG. 8 is shown with a manual backup setting 819. The manual backup setting 819 may indicate that the backup module 816 does not backup the collections 804 on the user device 814 unless prompted to do so by the user of the device 814.

Alternatively, the backing up of collections 804 to a backup server 818 may occur automatically. One of the backup modules 816 in FIG. 8 is shown with an automatic backup setting

817, which may indicate that the backup module 816 is configured to automatically backup the collections 804 on the user device 814 to the backup server 818. Collections 804 may be automatically backed up to a backup server 818 on a periodic basis (e.g., daily, weekly, etc.).

The backup server 818 may include a collections database 820. The collections database 820 may include backup copies of collections 804 for multiple users 821. The backup server 818 may also include a database manager 822. The database manager 822 may be configured to communicate with the backup modules 816 on the user devices 814 to facilitate the backing up of the collections 804 to the backup server 818.

FIG. 8 illustrates just one possible example of a system 800 for backing up collections 804 to a backup server 818. Other configurations are possible in accordance with the present disclosure. For example, although just a single collections database 820 is shown in FIG. 8, alternatively multiple collections databases 820 may be utilized. As another example, multiple backup servers 818 may be utilized. Also, FIG. 8 is not meant to imply that different user devices 814 backup their collections 804 to the backup server 818 at the same time. Different user devices 814 may backup their collections 804 to the backup server 818 at different times, or at the same time. The example shown in FIG. 8 should not be construed as limiting the scope of the present disclosure.

Figure 9:
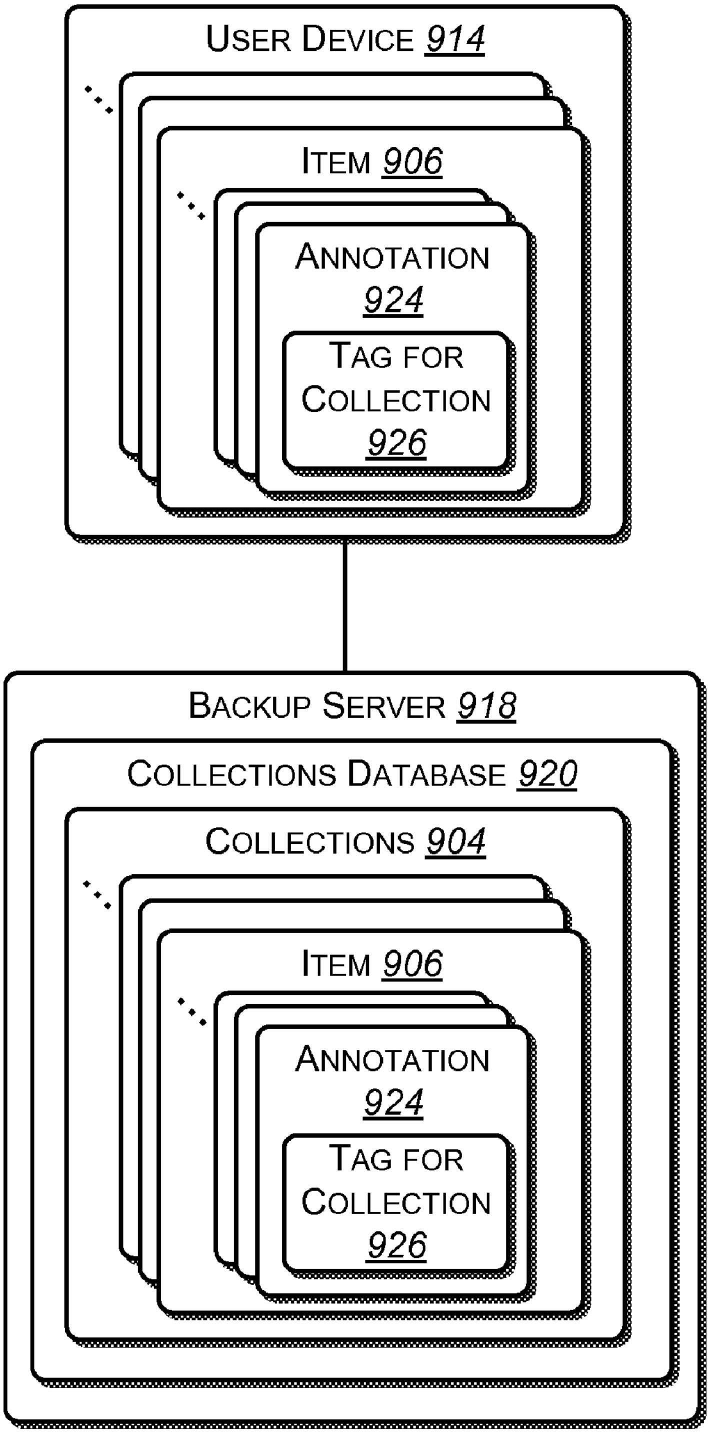
FIG. 9 illustrates an example showing how items may be associated with collections using annotations and tags.

Reference is now made to FIG. 9. FIG. 9 illustrates an example showing how items 906 may be associated with collections 904 using annotations 924 and tags 926.

A user device 914 is shown in electronic communication with a backup server 918. The user device 914 may be configured similarly to the user device 500 that is shown in FIG. 5. Multiple items 906 may be stored on the user device 914.

Each item 906 may be associated with one or more annotations 924. An annotation 924 may be any piece of information that is associated with an item 906. Annotations 924 may be provided by a user of the device 914. For example, if the user device 914 is configured similarly to the user device 500 that is shown in FIG. 5, the user may use the keyboard 518 to enter annotations 924.

One or more of the annotations 924 may include a tag 926. The tag 926 may associate the item 906 with a particular collection 904. A tag 926 may be a type of metadata, e.g., a keyword or term that is associated with and/or assigned to a collection 904. For example, a tag 926 may include textual information that is descriptive of the collection 904 with which the item 906 is being associated (e.g., a textual label for the collection 904).

The collections 904 on the user device 914 may be backed up to the backup server 918. The backup server 918 may include a collections database 920. The backup copies of the collections 904 on the user device 914 may be stored in the collections database 920. In the collections database 920, items 906 may be associated with collections 904 using annotations 924 and tags 926 in a similar manner to the way in which annotations 924 and tags 926 were used on the user device 914.

FIG. 9 illustrates just one possible way that items 906 may be associated with collections 904 using annotations 924 and tags 926. There are many other ways that this may be done in accordance with the present disclosure. For example, FIG. 9 shows annotations 924 and tags 926 being utilized on the user device 914 and also in the collections database 920. However, annotations 924 and tags 926 may be utilized on the user device 914 but not the collections database 920 (or vice versa). As another example, FIG. 9 shows just a single tag 926 being associated with an item 906. However, multiple tags 926 may be associated with a single item 906 (e.g., to associate the item 906 with multiple collections 904). Also, FIG. 9 shows all of the annotations 924 and tags 926 from the user device 914 being backed up on a single backup server 918 having a single collections database 920. Alternatively, multiple backup servers 918 and/or multiple collections databases 920 may be used to backup the annotations 924 and tags 926 from the user device 914. Additionally, FIG. 9 is showing a logical structure of a collections database 920. The logical structure that is shown in FIG. 9 may be implemented in a variety of ways. The example shown in FIG. 9 should not be construed as limiting the scope of the present disclosure.

Figure 10:
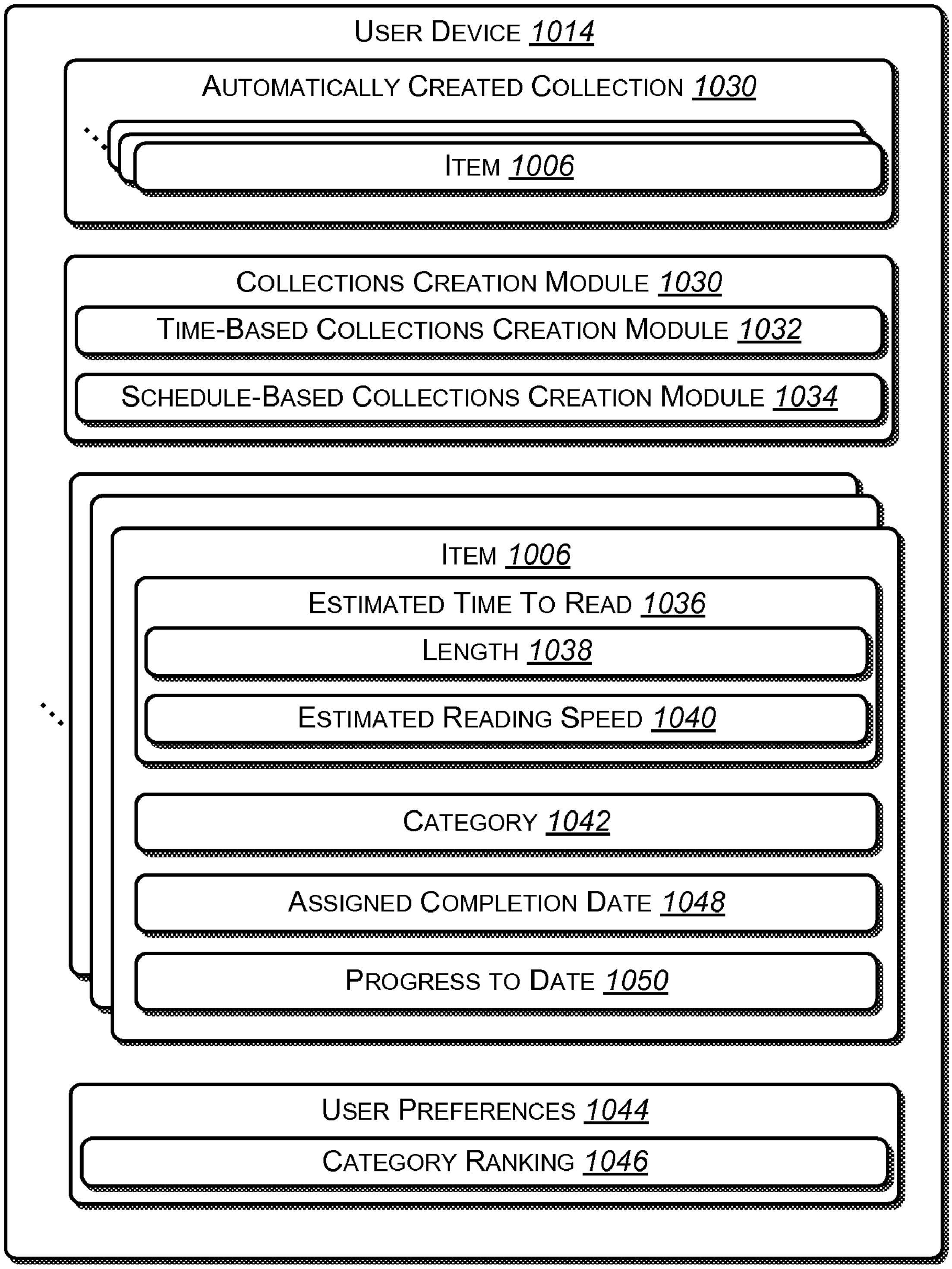
FIG. 10 illustrates an example of a user device that may be configured to automatically create collections based on certain criteria.

Reference is now made to FIG. 10. FIG. 10 illustrates an example of a user device 1014 that may be configured to automatically create collections 1004 based on certain criteria. The user device 1014 may be configured similarly to the user device 500 that is shown in FIG. 5.

One or more automatically created collections 1004 may be stored on the user device 1014. Each automatically created collection 1004 may include one or more items 1006. As indicated above, an item 1006 may be a specific unit of merchandisable content (e.g., an eBook, an issue of a magazine, etc.). Alternatively, an item 1006 may be a smaller part of a merchandisable unit (e.g., a chapter of an eBook, an article in a magazine, etc.).

The user device 1014 may include a collections creation module 1030. The collections creation module 1030 may be configured to automatically create collections 1004 for the user of the device 1014 based on certain criteria.

The collections creation module 1030 may include a time-based collections creation module 1032. The time-based collections creation module 1032 may be configured to automatically create collections 1004 of items 1006 that the user of the device 1014 may use (e.g., read, listen to, etc.) during a specified time period.

The collections creation module 1030 may also include a schedule-based collections creation module 1034. The schedule-based collections creation module 1034 may be configured to automatically create collections 1004 that may help keep the user of the device 1014 on a defined reading schedule with respect to one or more items 1006. This may be advantageous, for example, if the user of the device 1014 is taking a class and needs to keep on an assigned reading schedule.

Multiple items 1006 may be stored on the user device 1014. There may be certain information associated with each item 1006 that facilitates the automatic creation of collections 1004.

Some of the information associated with particular items 1006 may facilitate time-based automatic creation of collections 1004. For example, the estimated time to read 1036 a particular item 1006 may be associated with the item 1006. The estimated time to read 1036 may be based on the length 1038 of the item 1006 and/or an estimated reading speed 1040. The estimated reading speed 1040 may be determined with respect to an average user, or to the specific user of the device 1014.

Each item 1006 may also be associated with one or more categories 1042. Examples of categories 1042 may include: science fiction, biography, sports, current events, school, etc.

Some items 1006 may be assigned to the user of the device 1014. For example, this may be the case where the user of the device 1014 is a student. Each assigned item 1006 may be associated with an assigned completion date 1048. The assigned completion date 1048 may be the date that the user of the device 1014 has been assigned to complete reading of the item 1006. The user's progress to date 1050 may also be stored on the user device 1014. The progress to date 1050 may indicate how much of the item 1006 has been read, and how much remains to be read (or listened to, etc.).

User preferences 1044 may also be stored on the user device 1014. Examples of user preferences 1044 include category rankings 1046. The category rankings 1046 may provide a way to prioritize the categories 1042 of items 1006 that are stored on the user device 1014. For example, if the user of the device 1014 is a fan of science fiction, then the science fiction category 1042 may be ranked first.

FIG. 10 illustrates just one example of a user device 1014 that may be configured to automatically create collections 1004 based on certain criteria. Other configurations are possible in accordance with the present disclosure. For example, the collections creation module 1030 may be capable of automatically creating collections 1004 based on criteria other than (or possibly in addition to) time and/or an assigned schedule. Also, although this is not explicitly shown in FIG. 10, the user device 1014 may include both automatically created collections 1004 and manually created collections 1004. Moreover, in addition to automatically creating collections, the user device 1014 may also be configured to automatically remove items 1006 from a collection. Other modifications to the user device 1014 shown in FIG. 10 are also possible in accordance with the present disclosure. The example shown in FIG. 10 should not be construed as limiting the scope of the present disclosure.

Figure 11:
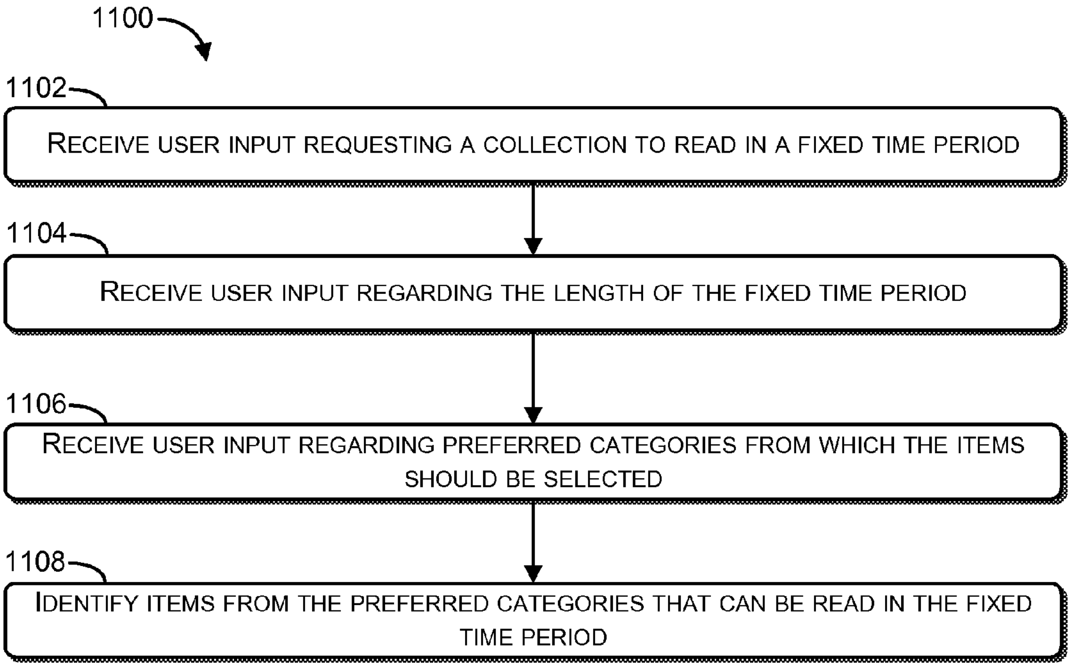
FIG. 11 illustrates an example of a method for time-based automatic creation of collections.

Reference is now made to FIG. 11. FIG. 11 illustrates an example of a method 1100 for time-based automatic creation of collections 1004. The time-based collections creation module 1032 in the user device 1014 of FIG. 10 may be configured to operate in accordance with the depicted method 1100.

The method 1100 may include receiving 1102 user input requesting a collection 1004 to read in a specified time period. For example, if the user of the device 1014 has a thirty-minute train ride to work, the user of the device 1014 may request a collection 1004 of items 1006 to read in that thirty-minute commute.

The method 1100 may also include receiving 1104 user input regarding the length of the time period for which the requested collection 1004 is to be created. In the above example, the user of the device 1014 may input the length of his/her commute (e.g., thirty minutes).

The method 1100 may also include receiving 1106 user input regarding preferred categories 1042 from which the items 1006 in the automatically-created collection 1004 should be selected. For example, suppose that one of the available categories 1042 is related to current events. If the user of the device 1014 wants to catch up on current events during his/her commute, the user may provide input indicating that the items 1006 in the automatically-created collection 1004 should be selected from the current events category.

The method 1100 may also include identifying 1108 items 1006 from the preferred categories 1042 that may be read in the available time period. For example, if the estimated time to read 1036 a particular item 1006 exceeds the available time period, then that item 1006 may not be included in the automatically created collection 1004. However, if the estimated time to read 1036 a particular item 1006 is less than the specified time period, that item 1006 may be included in the automatically-created collection 1004, possibly along with one or more other items 1006. For example, if the available time period is thirty minutes, then the automatically-created collection 1004 may include an item 1006 that may be read in ten minutes, another item 1006 that may be read in fifteen minutes, and another item 1006 that may be read in five minutes.

FIG. 11 illustrates just one example of a method 1100 for time-based automatic creation of collections 1004. There are many possible modifications to the method 1100 in accordance with the present disclosure. For example, the user of the device 1014 may not provide input about preferred categories 1042, and identification 1108 of items 1006 may occur without reference to categories 1042. As another example, instead of providing input about a fixed time period, the user of the device 1014 may provide input about a range of time periods (e.g., twenty-five to thirty-five minutes). Other modifications to the method 1100 shown in FIG. 11 are also possible in accordance with the present disclosure. The example shown in FIG. 11 should not be construed as limiting the scope of the present disclosure.

Figure 12:
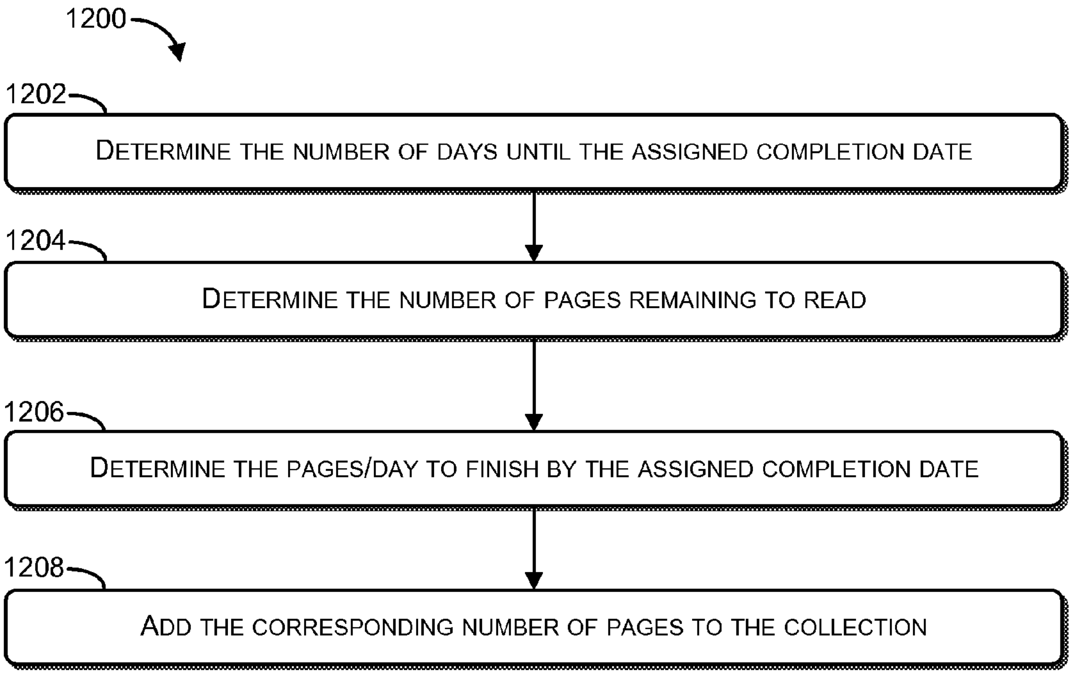
FIG. 12 illustrates an example of a method for schedule-based automatic creation of collections.

Reference is now made to FIG. 12. FIG. 12 illustrates an example of a method 1200 for schedule-based automatic creation of collections 1004. The schedule-based collections creation module 1034 in the user device 1014 of FIG. 10 may be configured to operate in accordance with the depicted method 1200.

The method 1200 may be performed with respect to an item 1006 that has been assigned to the user of the device 1014 (e.g., a reading assignment for a class that the user of the device 1014 is taking). As indicated above, an item 1006 that has been assigned to the user of the device 1014 may have an assigned completion date 1048. Also, the user's progress to date 1050 with respect to the assigned item 1006 may be stored on the user device 1014. In the depicted method 1200 it is assumed that the assigned item 1006 is some type of reading material (e.g., an eBook, an article in a magazine, etc.).

The method 1200 may include determining 1202 the number of days until the assigned completion date 1048. The method 1200 may also include determining 1204 the number of pages remaining to read. This may involve evaluating the user's progress to date 1050 with respect to the assigned item 1006.

The method 1200 may also include determining 1206 the number of pages to be read per day to finish by the assigned completion date 1048. This may involve dividing the number of pages remaining to read by the number of days until the assigned completion date 1048.

The method 1200 may also include creating 1208 a collection 1004 that includes the appropriate number of pages in order to stay on schedule to finish reading the item 1006 by the assigned completion date 1048. The method 1200 may be repeated with respect to one or more other assigned items 1006, and pages from those other assigned items 1006 may also be added to the automatically-created collection 1004. Once the automatically-created collection 1004 has been completed, the user of the device 1014 may know exactly what items 1006 should be read today in order to stay on schedule with respect to assigned completion dates 1048 for assigned items 1006.

FIG. 12 illustrates just one example of a method 1200 for schedule-based automatic creation of collections 1004. There are many possible modifications to the method 1200 in accordance with the present disclosure. For example, although in the method 1200 shown in FIG. 12 it is assumed that the assigned item 1006 is some type of reading material, a similar method may be performed for other types of items 1006 that do not include reading material (e.g., audiobooks). As another example, in the method 1200 of FIG. 12 it is assumed that the user of the device 1014 reads an equal number of pages/day. Alternatively, the user of the device 1014 may be able to read more pages on some days than others, and this may be taken into consideration when determining 1206 the pages/day to finish by the assigned completion date 1048. Other modifications to the method 1200 shown in FIG. 12 are also possible in accordance with the present disclosure. The example shown in FIG. 12 should not be construed as limiting the scope of the present disclosure.

Figure 13:
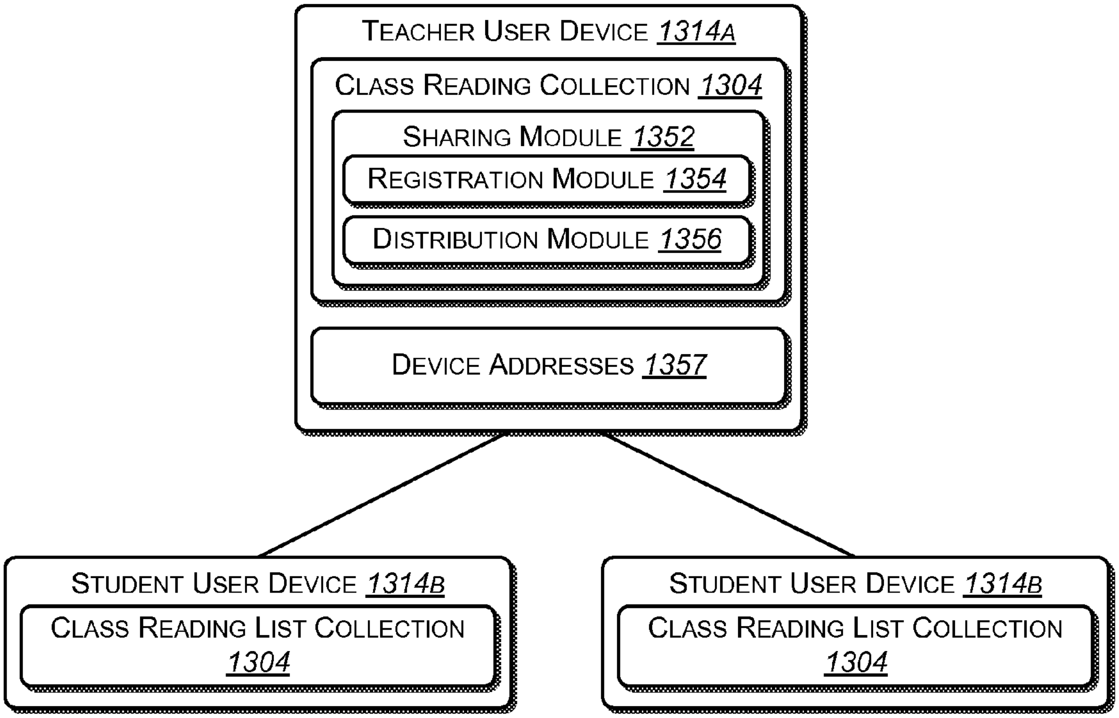
FIG. 13 illustrates an example showing how a person may share one or more collections with other people.

Reference is now made to FIG. 13. FIG. 13 illustrates an example showing how a person may share one or more collections 1304 with other people.

The example shown in FIG. 13 is relevant to a classroom setting. Multiple user devices 1314 are shown. In particular, a user device 1314*a* belonging to a teacher is shown. Also, multiple user devices 1314*b* belonging to students are shown. Each user device 1314 may be configured similarly to the user device 500 that is shown in FIG. 5.

A class reading list collection 1304 may be stored on the teacher user device 1314*a*. The class reading list collection 1304 may include items 606 (e.g., chapters from textbooks, articles from magazines, etc.) that the teacher would like students of the class to read. The class reading list collection 1304 may be created by the teacher.

The teacher user device 1314*a* may also include a sharing module 1352. The sharing module 1352 may be configured to facilitate sharing of the class reading list collection 1304 with students of the class.

The sharing module 1352 may include a registration module 1354. The registration module 1354 may be configured to permit students to register to receive copies of the class reading list collection 1304, as well as updates to the class reading list collection 1304. For example, the teacher may update the class reading list collection 1304 on a periodic basis (e.g., weekly). Whenever updates to the class reading list collection 1304 are made, updated versions of the class reading list collection 1304 may be transmitted to devices 1314*b* of students who have registered for the class reading list collection 1304.

The sharing module 1352 may also include a distribution module 1356. The distribution module 1356 may be configured to distribute the class reading list collection 1304, and updates to the class reading list collection 1304, to devices 1314*b* of students who have registered for the class reading list collection 1304.

Device addresses 1357 may also be stored on the teacher user device 1314*a*. The device addresses 1357 may be addresses of student user devices 1314*b* that have registered to receive the class reading list collection 1304. The distribution module 1356 may use the device addresses 1357 to distribute the class reading list collection 1304 to devices 1304*b* of registered students.

FIG. 13 illustrates just one example of a way in which a person may share one or more collections 1304 with other people. There are many other ways that this may be done in accordance with the present disclosure. For example, instead of distributing the class reading list collection 1304 directly to the student user devices 1314*b*, the class reading list collection 1304 may be stored on a server, and the student user devices 1314*b* may download the class reading list collection 1304 from the server. Also, although the example shown in FIG. 13 is relevant to a classroom setting, collections 1304 may be shared in a variety of other contexts and situations. For example, famous individuals (e.g., well-known entertainers, athletes, business leaders) may make their personal collections 1304 available to interested individuals, such as fans. Other variations are also possible in accordance with the present disclosure. The example shown in FIG. 13 should not be construed as limiting the scope of the present disclosure.

Figure 14:
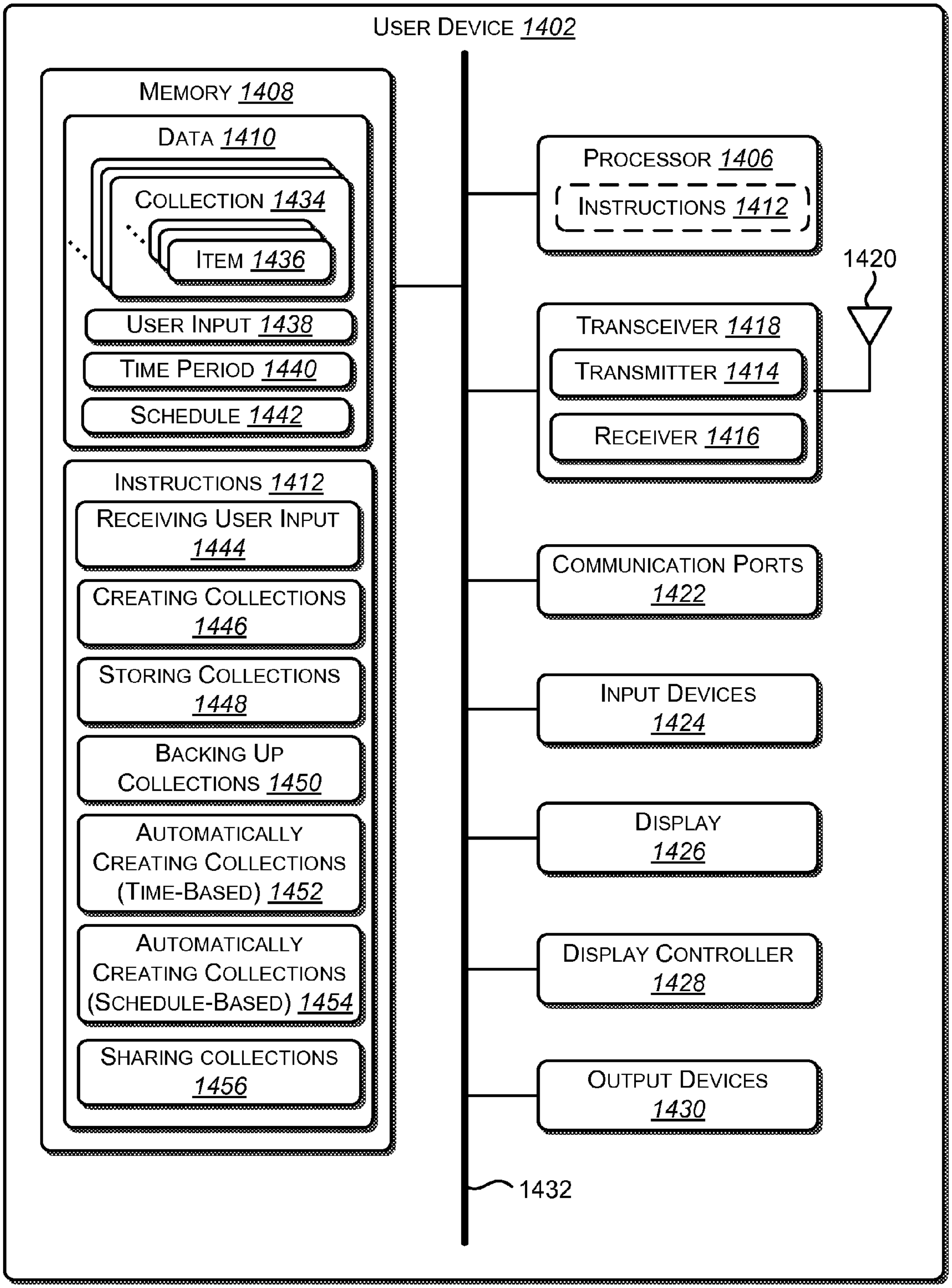
FIG. 14 illustrates an example of a user device that is configured to facilitate the creation and use of collections.

Reference is now made to FIG. 14. FIG. 14 illustrates an example of a user device 1402 that is configured to facilitate the creation and use of collections 1434. The user device 1402 is an example of an electronic device that may be configured to implement the techniques described herein.

The user device 1402 may be an eBook reader, i.e., a device that may be used to read eBooks. If the user device 1402 is an eBook reader, the eBook reader may be specifically designed for the purpose of reading eBooks. Alternatively, the eBook reader may be intended for other purposes as well. The user device 1402 may be configured similarly to the user device 500 that is shown in FIG. 5.

The user device 1402 includes a processor 1406. The processor 1406 may be a general purpose single- or multi-chip microprocessor (e.g., an ARM), a special purpose microprocessor (e.g., a digital signal processor (DSP)), a microcontroller, a programmable gate array, etc. The processor 1406 may be referred to as a central processing unit (CPU).

The user device 1402 also includes memory 1408. The memory 1408 may be any electronic component capable of storing electronic information. The memory 1408 may be embodied as random access memory (RAM), read only memory (ROM), magnetic disk storage media, optical storage media, flash memory devices in RAM, on-board memory included with the processor, EPROM memory, EEPROM memory, registers, and other non-transitory computer-readable storage media, including combinations thereof.

Data 1410 and instructions 1412 may be stored in the memory 1408. The instructions 1412 may be executable by the processor 1406 to perform various tasks and to implement various methods, such as the tasks and methods described herein. Executing the instructions 1412 may involve the use of the data 1410 that is stored in the memory 1408.

The user device 1402 may also include a transmitter 1414 to allow transmission of data from the user device 1402 to a remote location. The user device 1402 may also include a receiver 1416 to allow reception of data at the user device 1402 from a remote location. The transmitter 1414 and receiver 1416 may be collectively referred to as a transceiver 1418. An antenna 1420 may be electrically coupled to the transceiver 1418.

The user device 1402 may also include one or more communication ports 1422 for communicating with other electronic devices. Communication with other electronic devices may occur directly and/or via a computer network. Some examples of communication ports 1422 include Ethernet ports, Universal Serial Bus (USB) ports, parallel ports, serial ports, etc.

The user device 1402 may also include one or more input devices 1424. Examples of input devices 1424 include a keyboard, mouse, remote control device, microphone, button, joystick, trackball, touchpad, lightpen, etc.

The user device 1402 may also include a display 1426. A display controller 1428 may also be provided, for converting data 1410 stored in the memory 1408 into text, graphics, and/or moving images (as appropriate) shown on the display 1426.

The display 1426 may be an electronic paper display, which is a display that is capable of holding text and images indefinitely without drawing electricity, while allowing the text and images to be changed later. There are several different technologies that may be used to create an electronic paper display, including electrophoretic display technology, bistable liquid crystal display (LCD) technology, cholesteric LCD display technology, etc. Alternatively, the display 1426 may utilize another image projection technology, such as liquid crystal display (LCD), gas plasma, light-emitting diode (LED), etc. One or more other output devices 1430, such as audio speakers, may also be included in the user device 1402.

The various components of the user device 1402 may be coupled together by one or more buses, which may include a power bus, a control signal bus, a status signal bus, a data bus, etc. For the sake of clarity, the various buses are illustrated in FIG. 14 as a bus system 1432.

The data 1410 in the memory 1408 may include one or more collections 1434. Each collection 1434 may include one or more items 1436. As indicated above, an item 1436 may be a specific unit of merchandisable content (e.g., an eBook, an issue of a magazine, etc.). Alternatively, an item 1436 may be a smaller part of a merchandisable unit (e.g., a chapter of an eBook, an article in a magazine, etc.).

The data 1410 in the memory 1408 may also include user input 1438. The user input 1438 may be related to the creation of collections 1434 of items 1436 that are stored on the electronic device 1402. Alternatively, or in addition, the user input 1438 may be related to the backing up of collections 1434 to a backup server 818.

The data 1410 in the memory 1408 may also include one or more defined time periods 1440 that may relate to time-based automatic creation of collections 1434. The data 1410 in the memory 1408 may also include one or more defined schedules 1442 that may relate to schedule-based automatic creation of collections 1434.

The instructions 1412 in the memory 1408 may include instructions 1444 for receiving user input 1438 related to the creation of collections 1434 of items 1436 that are stored on the electronic device 1402. The user input 1438 may specify which collections 1434 are to be created. The user input 1438 may also specify which items 1436 should be included in the collections 1434 that are created.

The instructions 1412 in the memory 1408 may also include instructions 1446 for creating collections 1434 of items 1436 based on the user input 1438. The instructions 1412 in the memory 1408 may also include instructions 1448 for storing the collections 1434 on the electronic device 1402.

The instructions 1412 in the memory 1408 may also include instructions 1450 for backing up the collections 1434 to a backup server 818. The backing up of the collections 1434 may occur in response to user input 1438. Alternatively, the backing up of the collections 1434 may occur automatically. An example of a system 800 for backing up collections 804 to a backup server 818 was discussed above in relation to FIG. 8.

The instructions 1412 in the memory 1408 may also include instructions 1452, 1454 for automatically creating collections 1434 of items 1436. For example, instructions 1452 may be provided for automatically creating one or more collections 1434 for use by the user of the device 1402 during a specified time period 1440. An example of a method 1100 for time-based automatic creation of collections 1004 was discussed above in relation to FIG. 11. As another example, instructions 1454 may be provided for automatically creating one or more collections 1434 for keeping the user of the device 1402 on a defined schedule 1442. An example of a method 1200 for schedule-based automatic creation of collections 1004 was discussed above in relation to FIG. 12.

The instructions 1412 in the memory 1408 may also include instructions 1456 for sharing one or more of the collections 1434 with at least one user of another electronic device 1402. An example showing how a person may share one or more collections 1304 with other people was discussed above in relation to FIG. 13.

FIG. 14 illustrates just one possible example of a user device 1402 that is configured to facilitate the creation and use of collections 1434. There are a number of modifications that may be made to the user device 1402 in accordance with the present disclosure. For example, although just a single processor 1406 is shown in the user device 1402 of FIG. 14, alternatively a combination of processors 1406 (e.g., an ARM and DSP) could be used. As another example, the user device 1402 may include multiple transmitters 1414, multiple receivers 1416, multiple transceivers 1418 and/or multiple antenna 1420. Also, some of the data 1410 and/or the instructions 1412 that are shown in the memory 1408 of the user device 1402 may be optional and may be omitted. For example, the defined time period(s) 1440, the defined schedule(s) 1442, the instructions 1452, 1454 for automatically creating collections 1434 of items 1436 and the instructions 1456 for sharing collections 1434 may be optional and may be omitted. Other modifications are also possible in accordance with the present disclosure. Thus, the example shown in FIG. 14 should not be construed as limiting the scope of the present disclosure.

Figure 15:
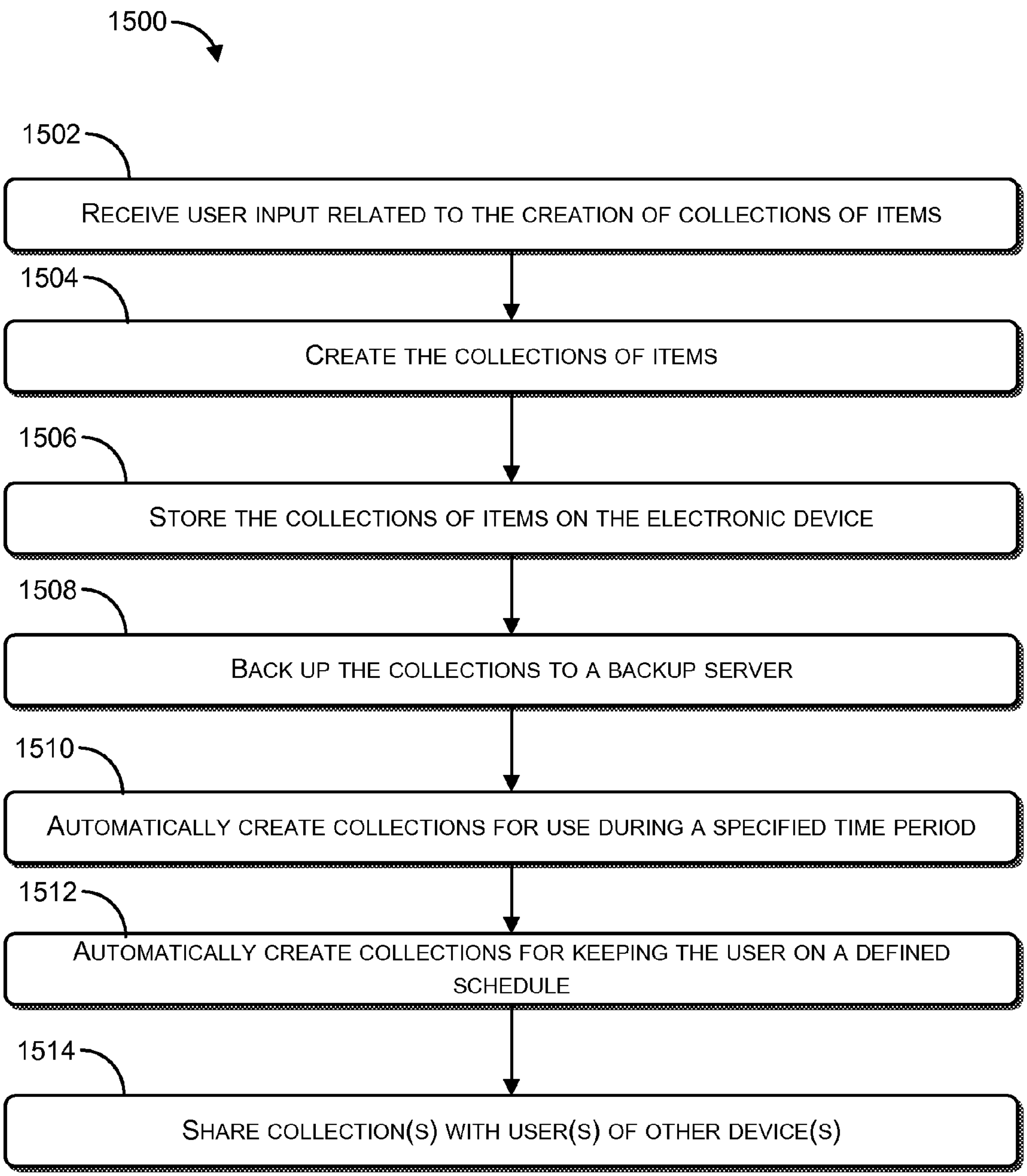
FIG. 15 illustrates an example of a method for facilitating the creation and use of collections on an electronic device.

Reference is now made to FIG. 15. FIG. 15 illustrates an example of a method 1500 for facilitating the creation and use of collections 1434 on an electronic device 1402. The method 1500 may be implemented by an electronic device 1402. The instructions 1412 in the memory 1408 of the electronic device 1402 may be executed by the processor 1406 to implement the depicted method 1500.

The method 1500 may include receiving 1502 user input 1438 related to the creation of collections 1434 of items 1436 that are stored on the electronic device 1402. The user input 1438 may specify which collections 1434 are to be created. The user input 1438 may also specify which items 1436 should be included in the collections 1434 that are created.

The method 1500 may also include creating 1504 the collections 1434 of items 1436 based on the user input 1438. The method 1500 may also include storing 1506 the collections 1434 on the electronic device 1402.

The method 1500 may also include backing up 1508 the collections 1434 to a backup server 818. The backing up 1508 of the collections 1434 may occur in response to user input 1438. Alternatively, the backing up of the collections 1434 may occur automatically. An example of a system 800 for backing up collections 804 to a backup server 818 was discussed above in relation to FIG. 8.

The method 1500 may also include automatically creating 1510, 1512 collections 1434 of items 1436. For example, one or more collections 1434 may be automatically created 1510 for use by the user of the device 1402 during a specified time period 1440. An example of a method 1100 for time-based automatic creation of collections 1004 was discussed above in relation to FIG. 11. As another example, one or more collections 1434 may be automatically created 1512 for keeping the user of the device 1402 on a defined schedule 1442. An example of a method 1200 for schedule-based automatic creation of collections 1004 was discussed above in relation to FIG. 12.

The method 1500 may also include sharing 1514 one or more of the collections 1434 with at least one user of another electronic device 1402. An example showing how a person may share one or more collections 1304 with other people was discussed above in relation to FIG. 13.

As mentioned, the method 1500 may be implemented by an electronic device 1402. The electronic device 1402 that implements the method 1500 may be an eBook reader. At least some of the items 1436 in the collections 1434 may be eBooks.

FIG. 15 illustrates just one example of a method 1500 for facilitating the creation and use of collections 1434 on an electronic device 1402. There are many possible modifications to the method 1500 in accordance with the present disclosure. Some of the steps in the method 1500 may be optional and may be omitted. For example, the steps of automatically creating 1510, 1512 collections 1434 of items 1436 and/or sharing 1514 one or more collections 1434 may be optional. Other modifications to the method 1500 shown in FIG. 15 are also possible in accordance with the present disclosure. The example shown in FIG. 15 should not be construed as limiting the scope of the present disclosure.

As used herein, the term "determining" encompasses a wide variety of actions and, therefore, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on."

As used herein, the terms "code" and "instructions" should be interpreted broadly to include any type of computer-readable statement(s). For example, the terms "code" and "instructions" may refer to one or more programs, routines, sub-routines, functions, procedures, etc.

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor may read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that may be accessed by a computer. By way of example, and not limitation, a computer-readable medium may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® Blu-ray disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic book (eBook) reader that is configured to facilitate the creation and use of collections of items, the eBook reader comprising:

a processor;

memory in electronic communication with the processor;

instructions stored in the memory, the instructions being executable to:

receive user input related to the creation of collections of items and specifying a time period for consuming at least one collection of the collections of items, the items in the collections including one or more eBooks;

create the collections of items including the at least one collection at least some of the collections created automatically, the at least one collection including a reading list created by a user of the eBook reader, the reading list to be shared with other users;

determine a schedule for consuming each of the items in the at least one collection during the specified time period, the schedule determined based at least partly on a length of each of the items in the at least one collection and an estimated reading speed of at least one of the other users;

store the collections of items on the eBook reader; and share the schedule and the at least one collection that includes the reading list with another eBook reader associated with at least one of the other users.

2. A method for facilitating the creation and use of collections on an electronic device, comprising:

receiving user input related to the creation of collections of items that are stored on the electronic device and a time period to consume at least one collection of the collections of items, the collections of items including at least one electronic book (eBook);

creating the collections of items including the at least one collection, the collections of items to be stored on the electronic device;

creating a schedule for consuming each of the items in the at least one collection during the specified time period, the schedule determined based at least partly on a length of each of the items in the at least one collection and an estimated reading speed of at least one other user;

storing the collections of items on the electronic device; and sharing the schedule and the at least one collection with at least one additional electronic device associated with the at least one other user, the shared collection of items including a reading list.

3. The method of claim 2, wherein the electronic device is an electronic book (eBook) reader.

4. The method of claim 2, further comprising backing up the collection of items to a backup server in response to user input.

5. The method of claim 2, further comprising automatically backing up the collection of items to a backup server.

6. The method of claim 2, further comprising automatically creating at least one of the collections for the user of the electronic device.

7. The method of claim 2, further comprising automatically creating collections of items for keeping the user of the electronic device on a defined schedule.

8. The method of claim 2, further comprising sharing one or more additional collections of items with the at least one additional electronic device.

9. A computer program stored in a non-transitory computer readable storage medium, the computer program including instructions that are executable by a processor for performing the method of claim 2.

10. An electronic device that is configured to facilitate the creation and use of collections of items, the electronic device comprising:

one or more processors;

memory in electronic communication with the one or more processors;

instructions stored in the memory, the instructions being executable by the one or more processors to:

receive user input related to the creation of collections of items for storage on the electronic device, the items in the collections of items including one or more electronic books (eBooks);

receive a time period in which to consume at least one collection of the collections of items;

create the at least one collection for use during the time period, the at least one collection including a reading list that is to be shared with other users;

determine a schedule for consuming each of the items in the at least one collection during the time period, the schedule determined based at least partly on a length of each of the items in the at least one collection and an estimated reading speed of at least one of the other users;

store the at least one collection on the electronic device; and share the schedule and the at least one collection with at least one other electronic device, the at least one collection including a reading list.

11. The electronic device of claim 10, wherein the electronic device is an electronic book (eBook) reader.

12. The electronic device of claim 10, further comprising backing up the collection of items to a backup server in response to user input.

13. The electronic device of claim 10, further comprising automatically backing up the collection of items to a backup server.

14. The electronic device of claim 10, wherein the instructions are also executable to automatically create at least one of the collections for the user of the electronic device.

15. The electronic device of claim 10, wherein the instructions are also executable to automatically create collections of items for keeping the user of the electronic device on a defined schedule.

16. A non-transitory computer-readable medium comprising instructions executable by one or more processors to perform acts comprising:

receiving user input related to creation of a collections of items on an electronic device and specifying a time period for consuming at least one collection of the collections of items, the collections of items include one or more electronic books (eBooks);

creating the collections of items including the at least one collection during the specified time period, the at least one collection including a list of reading material associated with a particular subject, the collections of items to be stored on the electronic device, the list of reading material to be shared with other users;

creating a schedule for consuming each of the items in the at least one collection during the specified time period, the schedule determined based at least partly on a length of each of the items in the at least one collection and an estimated reading speed of at least one of the other users;

storing the collections of items on the electronic device; and sharing the schedule and the at least one collection that includes the list of reading material with one or more electronic devices.

* * * * *